US007630960B2

(12) United States Patent
Koike et al.

(10) Patent No.: US 7,630,960 B2
(45) Date of Patent: Dec. 8, 2009

(54) DATA PROCESSING SYSTEMS AND METHODS FOR DATA RETRIEVAL

(75) Inventors: Hiroyuki Koike, Kanagawa (JP); Nobukazu Koyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 488 days.

(21) Appl. No.: 10/315,491

(22) Filed: Dec. 10, 2002

(65) Prior Publication Data
US 2003/0120634 A1 Jun. 26, 2003

(30) Foreign Application Priority Data
Dec. 11, 2001 (JP) ............................. P2001-377659

(51) Int. Cl.
*G06F 7/00* (2006.01)
*G06F 17/30* (2006.01)
*G06F 15/16* (2006.01)

(52) U.S. Cl. .................. 707/3; 707/1; 707/5; 709/203; 709/201

(58) Field of Classification Search ...................... 707/1, 707/3, 5, 10; 709/201, 203, 204; 705/26
See application file for complete search history.

(56) References Cited

U.S. PATENT DOCUMENTS

| 5,619,692 | A | * | 4/1997 | Malkemus et al. ............. 707/2 |
| 6,134,532 | A | * | 10/2000 | Lazarus et al. ................ 705/14 |
| 6,236,768 | B1 | * | 5/2001 | Rhodes et al. .............. 382/306 |
| 6,621,930 | B1 | * | 9/2003 | Smadja ....................... 382/224 |
| 6,647,383 | B1 | * | 11/2003 | August et al. .................. 707/3 |
| 6,654,735 | B1 | * | 11/2003 | Eichstaedt et al. ............. 707/3 |
| 6,832,242 | B2 | * | 12/2004 | Keskar ....................... 709/204 |
| 6,834,294 | B1 | * | 12/2004 | Katz ........................... 709/203 |
| 6,845,374 | B1 | * | 1/2005 | Oliver et al. ................... 707/5 |
| 2002/0087632 | A1 | * | 7/2002 | Keskar ....................... 709/204 |
| 2003/0055894 | A1 | * | 3/2003 | Yeager et al. ............... 709/204 |
| 2008/0114756 | A1 | * | 5/2008 | Konig et al. ................... 707/5 |

FOREIGN PATENT DOCUMENTS

JP 2001-306606 11/2001

OTHER PUBLICATIONS

Antonucci, Robert, How Peer-to-Peer Can Help You, Jun. 2001, CommerceOne.*
Google, "How to Interpret Your Search Results" Dec. 6, 2001, Google.com via web archive <http://web.archive.org/web/20011206110646/www.google.com/intl/en/help/interpret.html>, p. 1-3.*

* cited by examiner

*Primary Examiner*—Apu M Mofiz
*Assistant Examiner*—Brent Stace
(74) *Attorney, Agent, or Firm*—K&L Gates LLP

(57) ABSTRACT

An interest vector is configured using a parameter indicating a degree of interest in each category based on user interest information received by a control server on a peer-to-peer network. An interest vector having a short distance from the interest vector of a requesting user who sent a content retrieval request is selected to make an inquiry about the presence or absence of the requested content. Therefore, reliable content retrieval can be achieved without storing content in the control server. The interest vector can be updated under various conditions, thus maintaining the accuracy of the user interest information.

34 Claims, 17 Drawing Sheets

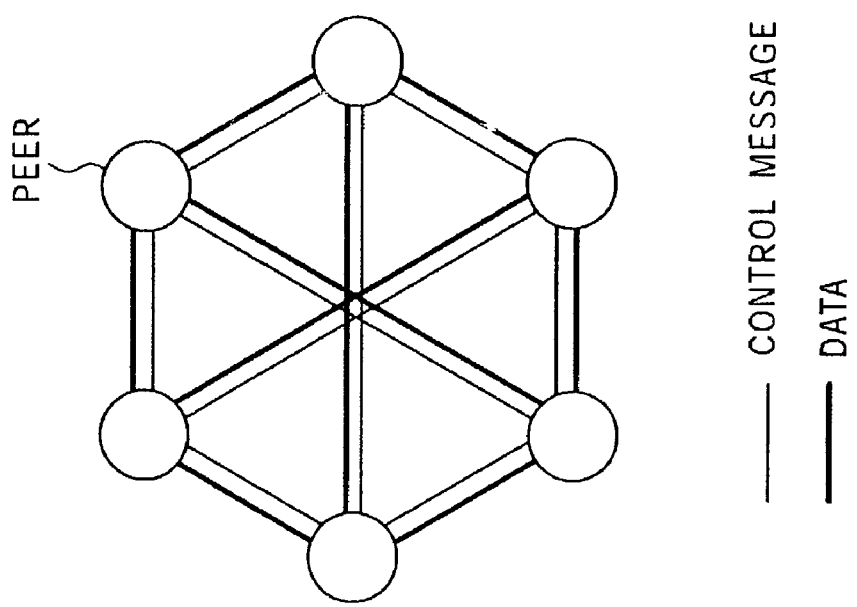
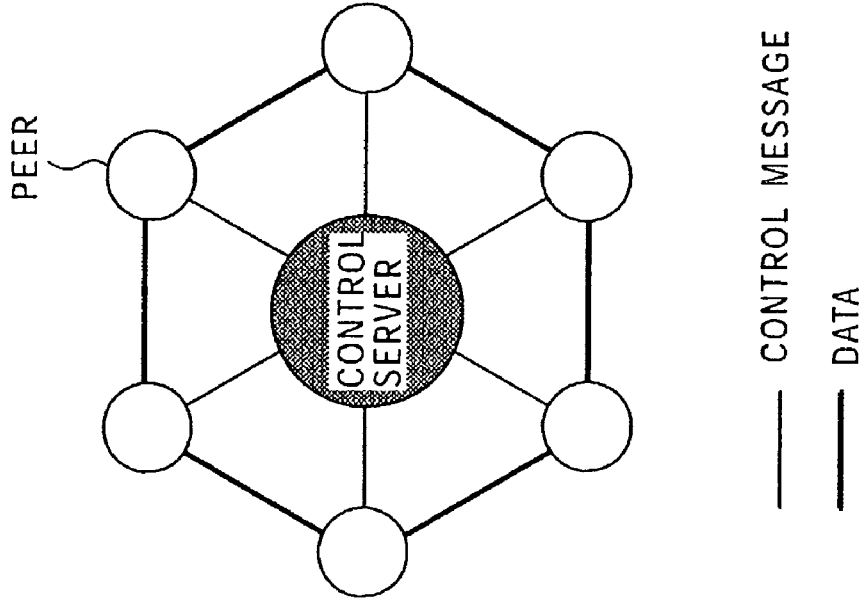

FIG. 3

| ID | CONTENT ID |
|---|---|
| 1 | crid://broadcaster.co.jp;comedy/wibble |
| 2 | http://www.sony.co.jp/contents/animal.mpg |
| 3 | ID:5793a79c21d9 |

FIG. 4

| ID | USER ID | IP ADDRESS OF USER DEVICE | USER INTEREST INFORMATION ||| |
|---|---|---|---|---|---|
| | | | INTEREST CATEGORY || INTEREST VECTOR | INITIAL INTEREST VECTOR |
| 1 | User_A | 10.1.1.1 | SPORTS | TENNIS | 7 | 3 |
| | | | | BASEBALL | 2 | 2 |
| | | | MUSIC | J-POP | 8 | 8 |
| 2 | User_B | 10.2.2.2 | SPORTS | TENNIS | 1 | 1 |
| | | | | BASEBALL | 4 | 3 |
| | | | MUSIC | J-POP | 7 | 5 |
| 3 | User_C | 10.3.3.3 | SPORTS | BASEBALL | 3 | 2 |
| | | | MUSIC | J-POP | 3 | 1 |
| 4 | User_D | 10.4.4.1 | SPORTS | TENNIS | 9 | 6 |
| | | | | BASEBALL | 4 | 3 |
| | | 10.4.4.2 | MUSIC | J-POP | 3 | 2 |

FIG. 7

| ID | USER ID | IP ADDRESS OF USER DEVICE | USER INTEREST INFORMATION ||
|---|---|---|---|---|
| | | | INTEREST CATEGORY || INITIAL INTEREST VECTOR |
| 1 | User_A | 10.1.1.1 | SPORTS | TENNIS | 3 |
| | | | | BASEBALL | 2 |
| | | | MUSIC | J-POP | 8 |

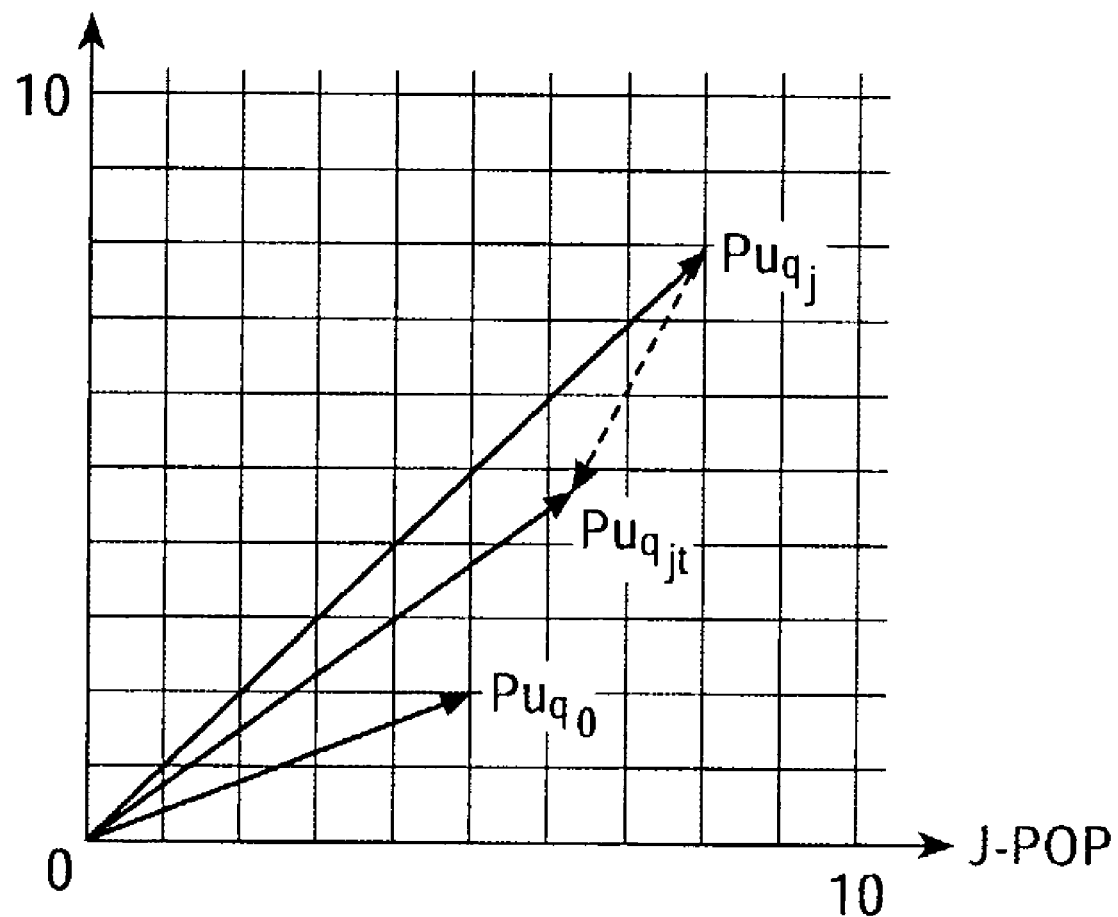

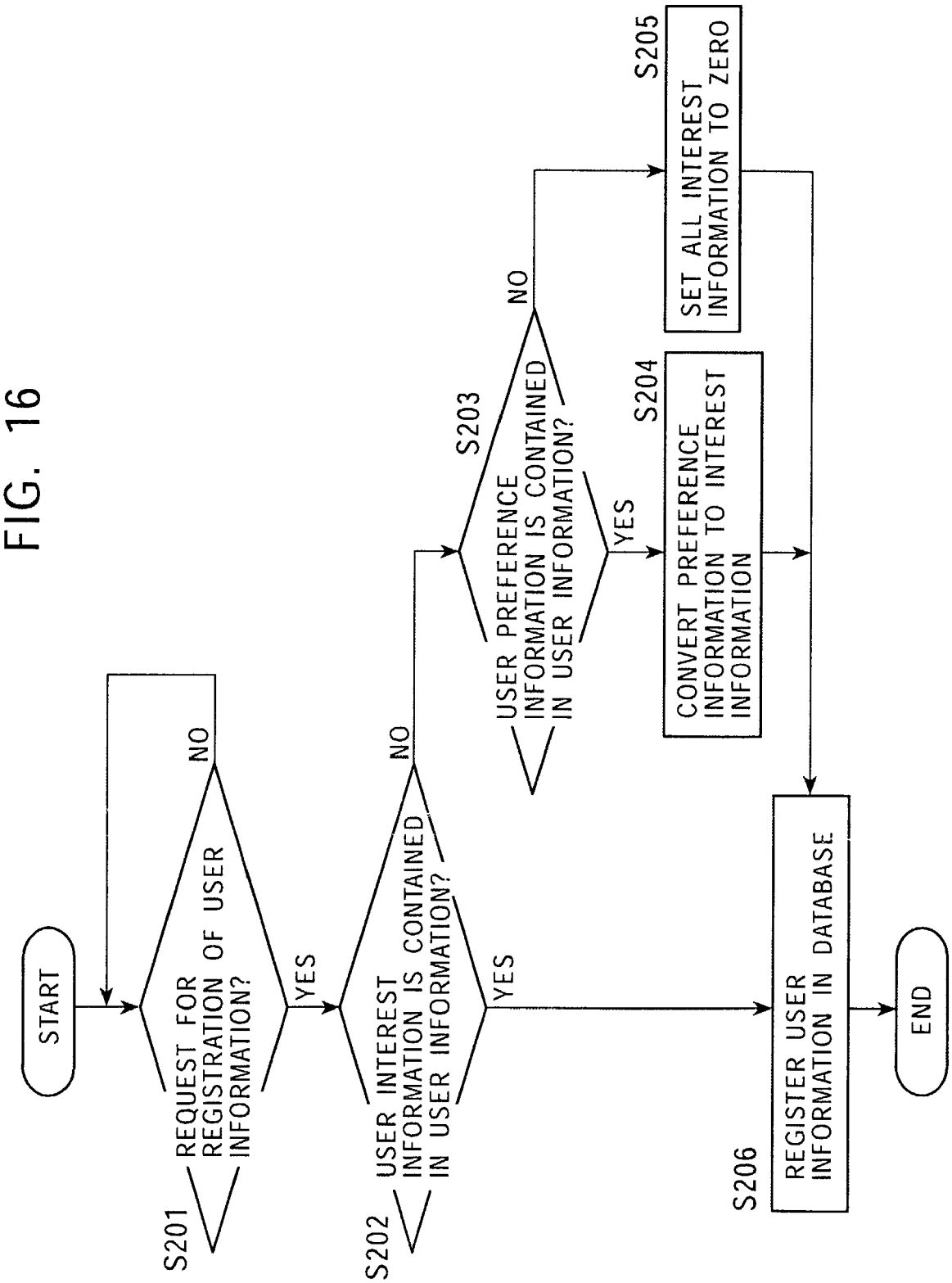

DATA PROCESSING SYSTEMS AND METHODS FOR DATA RETRIEVAL

BACKGROUND OF THE INVENTION

The present invention relates to a data processing system, a data processing method, an information processing device, and a computer program. More particularly, the present invention relates to a data processing system, a data processing method, an information processing device, and a computer program, which achieve better data retrieval efficiency on a peer-to-peer network.

Recently, images, audio data, various programs, and the like have been increasingly transferred over a communication network such as the Internet. Content exchanged over a network has changed from mono-media content including text and still images to multimedia content including moving pictures and audio. The volume of such multimedia content has tremendously increased.

Meanwhile, in recent years, peer-to-peer (P2P) network technology has been developed as a direct communication processing scheme between information processing devices. In the P2P network scheme, instead of using a server for performing intensive processing, information processing devices or resources owned by network clients, including personal computers (PCs), portable terminals, PDAs (personal digital assistants), cellular telephones, and other devices having the communication capability or connected to a communication device, such as disc devices serving as storage units and printers, communicate with each other over a network to share the resources of the network clients.

The P2P network technology is said to be first introduced in APPN (Advanced Peer-to-Peer Networking) proposed by International Business Machines Corporation. This network scheme eliminates necessity for a single giant delivery server which is required for content delivery in a traditional client-server network, while allowing content distributed in resources owned by network clients to be shared by a large number of users, thereby discretely storing and delivering a large volume of content.

Two types of peer-to-peer (P2P) networks are known, i.e., a pure peer-to-peer (P2P) network and a hybrid peer-to-peer (P2P) network. FIGS. 1A and 1B illustrate the pure P2P network and the hybrid P2P network, respectively. In the pure P2P network, system nodes (peer devices) having an equal function and role communicate with each other in a peer-to-peer fashion. A typical service using the pure P2P network is Gnutella (http://gnutella.wego.com/). In the hybrid P2P network, a control server for providing smooth interaction between system nodes (peer devices) is further provided for the pure P2P network. A typical service using the hybrid P2P network is Napster® (http://www.napster.com/).

However, these traditional P2P networks have suffered from the following problems in order to retrieve desired content:

1. the pure P2P network does not include a database for managing content and users, leading to an increased amount of traffic when desired content is retrieved, and it may therefore be difficult to retrieve the desired content; and 2. the hybrid P2P network requires a database for managing a correspondence between content and a system node (peer device) having the content, resulting in a high load on a managing server.

SUMMARY OF THE INVENTION

Accordingly, in view of the above problems, it is an object of the present invention to provide a data processing system including a control server for managing user information, and network nodes or peer information processing devices having content, in which user interest information is used to efficiently retrieve desired content without adding metadata to the content or without managing the content in the control server, thereby achieving better content retrieval efficiency on a peer-to-peer (P2P) network. The present invention is further intended to provide a data processing method, an information processing device, and a computer program, which achieve better content retrieval efficiency on a P2P network.

In a first aspect of the present invention, a data processing system includes a plurality of peer information processing devices and a control server which are connected with each other over a network. Each of the peer devices includes a content database from which content is retrieved based on a content identifier. The control server includes a user information database, a content retrieval request processing unit, and a device search requesting unit. The user information database stores, in correspondence with each other, interest information of users of the peer devices and identification data for identifying the users, the interest information including a degree of interest of the users in categorized interest information. Upon receipt of a content retrieval request from one of the peer devices, the content retrieval request processing unit retrieves the interest information which is stored in the user information database in correspondence with the requesting peer device, and extracts from the user information database a user having similar interest information to the retrieved interest information. The device search requesting unit inquires about the presence or absence of the content in the peer device of the user extracted by the content retrieval request processing unit.

The user information database may store an interest vector which has a correspondence with the identification data of each of the users, the interest vector being expressed by a parameter indicating the categorized interest information. The content retrieval request processing unit may determine the distance between the interest vector of a user registered in correspondence with the requesting peer device and the interest vector of another user registered in the user information database to extract, as a user having similar interest information to the interest information of the user registered in correspondence with the requesting peer device, a user having a short interest vector distance from the interest vector of the user registered in correspondence with the requesting peer device.

The user information database may store an interest vector which has a correspondence with the identification data of each of the users, the interest vector being expressed by a parameter indicating the categorized interest information. The content retrieval request processing unit may determine the distance between the interest vector of a user registered in correspondence with the requesting peer device and the interest vector of another user registered in the user information database to sequentially extract users having shorter distances from the interest vector of the user registered in correspondence with the requesting peer device in the ascending order. The device search requesting unit may inquire about the presence or absence of the content in the peer devices in the order of the users extracted by the content retrieval request processing unit.

The user information database may store an interest vector which has a correspondence with the identification data of each of the users, the interest vector being expressed by a parameter indicating the categorized interest information. The content retrieval request processing unit may determine the distance between the interest vector of a user registered in correspondence with the requesting peer device and the interest vector of another user registered in the user information database to determine the vector lengths of users having an equal interest vector distance from the interest vector of the user registered in correspondence with the requesting peer device to sequentially extract users having greater vector lengths in the descending order. The device search requesting unit may inquire about the presence or absence of the content in the peer devices in the order of the users extracted by the content retrieval request processing unit.

The user information database may store an interest vector which has a correspondence with the identification data of each of the users, the interest vector being expressed by a parameter indicating the categorized interest information. The control server may further include a user interest managing unit. When a content retrieval is performed in response to a content retrieval request from one of the peer devices, the user interest managing unit may update the interest vector of the requesting user, whereby the distance between the interest vector of the requesting user and the interest vector of a user of one of the peer devices which provides the content is reduced.

The user information database may store an interest vector which has a correspondence with the identification data of each of the users, the interest vector being expressed by a parameter indicating the categorized interest information. The control server may further include a user interest managing unit. When a content retrieval in response to a content retrieval request from one of the peer devices is not performed for a predetermined time, the user interest managing unit may update the interest vector of the requesting user, whereby the distance between the interest vector of the requesting user and an initial interest vector of the requesting user which is initially registered in the user information database is reduced.

One of the peer devices may send a content retrieval request containing a user identifier and a content identifier to the control server. The content retrieval request processing unit in the control server may retrieve the interest information from the user information database based on the user identifier contained in the content retrieval request received from the requesting peer device, and may extract from the user information database a user having similar user interest information to the retrieved interest information. The content retrieval request processing unit may further send, to the requesting peer device, address information of one of the peer devices which is found by the content retrieval request processing unit and which provides the content.

The user information database may store an interest vector which has a correspondence with the identification data of each of the users, the interest vector being expressed by a parameter indicating the categorized interest information. The control server may further include a user information registration request processing unit. Upon receipt of user registration information from one of the peer devices, when the user registration information contains interest information, the user information registration request processing unit may register an interest vector based on the interest information in the user information database so as to have a correspondence with the identification data of each of the users. When the user registration information contains preference information, the user information registration request processing unit may convert a preference vector based on the preference information into the interest vector, and may register the converted interest vector in the user information database so as to have a correspondence with the identification data of each of the users.

In a second aspect of the present invention, in a data processing system including a plurality of peer information processing devices and a control server which are connected with each other over a network, a data processing method is performed by the control server. The method includes a request receiving step of receiving a content retrieval request from one of the peer devices; a retrieving step of searching a user information database which stores, in correspondence with each other, interest information of users of the peer devices and identification data for identifying the users, the interest information including a degree of interest of the users in categorized interest information, and retrieving the interest information of a user registered in correspondence to the requesting peer device; a user extracting step of extracting from the user information database a user having similar interest information to the interest information retrieved in the retrieving step; and an inquiring step of inquiring about the presence or absence of the content in the peer device of the user extracted in the user extracting step.

The user information database may store an interest vector which has a correspondence with the identification data of each of the users, the interest vector being expressed by a parameter indicating the categorized interest information. The user extracting step may include a step of determining the distance between the interest vector of the user registered in correspondence with the requesting peer device and the interest vector of another user registered in the user information database to extract, as a user having similar interest information to the interest information of the user registered in correspondence with the requesting peer device, a user having a short interest vector distance from the interest vector of the user registered in correspondence with the requesting peer device.

The user information database may store an interest vector which has a correspondence with the identification data of each of the users, the interest vector being expressed by a parameter indicating the categorized interest information. The user extracting step may include a step of determining the distance between the interest vector of the user registered in correspondence with the requesting peer device and the interest vector of another user registered in the user information database to sequentially extract users having shorter distances from the interest vector of the user registered in correspondence with the requesting peer device in the ascending order. The inquiring step may include a step of inquiring about the presence or absence of the content in the peer devices in the order of the users extracted in the user extracting step.

The user information database may store an interest vector which has a correspondence with the identification data of each of the users, the interest vector being expressed by a parameter indicating the categorized interest information. The user extracting step may include a step of determining the distance between the interest vector of the user registered in correspondence with the requesting peer device and the interest vector of another user registered in the user information database to determine the vector lengths of users having an equal interest vector distance from the interest vector of the user registered in correspondence with the requesting peer device to sequentially extract users having greater vector lengths in the descending order. The inquiring step may include a step of inquiring about the presence or absence of the content in the peer devices in the order of the users extracted in the user extracting step.

The user information database may store an interest vector which has a correspondence with the identification data of each of the users, the interest vector being expressed by a parameter indicating the categorized interest information. When a content retrieval is performed in response to a content retrieval request from one of the peer devices, the control server may perform an interest vector updating process for updating the interest vector of the requesting user, whereby the distance between the interest vector of the requesting user and the interest vector of a user of one of the peer devices which provides the content is reduced.

The user information database may store an interest vector which has a correspondence with the identification data of each of the users, the interest vector being expressed by a parameter indicating the categorized interest information. When a content retrieval in response to a content retrieval request from one of the peer devices is not performed for a predetermined time, the control server may perform an interest vector updating process for updating the interest vector of the requesting user, whereby the distance between the interest vector of the requesting user and an initial interest vector of the requesting user which is initially registered in the user information database is reduced. The control server may further perform a process for sending the requesting peer device address information of one of the peer devices which is found in the inquiring step and which provides the content.

The control server may further perform a process for, upon receipt of user registration information from one of the peer devices, when the user registration information contains interest information, registering an interest vector based on the interest information in the user information database so as to have a correspondence with the identification data of each of the users; and, when the user registration information contains preference information, for converting a preference vector based on the preference information into the interest vector, and for registering the converted interest vector in the user information database so as to have a correspondence with the identification data of each of the users.

In a third aspect of the present invention, an information processing device in a system including a plurality of peer information processing devices and a control server which are connected with each other over a network serves as the control server. The information processing device includes a user information database, a content retrieval request processing unit, and a device search requesting unit. The user information database stores, in correspondence with each other, interest information of users of the peer devices and identification data for identifying the users, the interest information including a degree of interest of the users in categorized interest information. Upon receipt of a content retrieval request from one of the peer devices, the content retrieval request processing unit retrieves the interest information of a user registered in correspondence to the requesting peer device from the user information database, and extracts from the user information database a user having similar interest information to the retrieved interest information. The device search requesting unit inquires about the presence or absence of the content in the peer device of the user extracted by the content retrieval request processing unit.

The user information database may store an interest vector which has a correspondence with the identification data of each of the users, the interest vector being expressed by a parameter indicating the categorized interest information. The content retrieval request processing unit may determine the distance between the interest vector of the user registered in correspondence with the requesting peer device and the interest vector of another user registered in the user information database to extract, as a user having similar interest information to the interest information of the user registered in correspondence with the requesting peer device, a user having a short interest vector distance from the interest vector of the user registered in correspondence with the requesting peer device.

The user information database may store an interest vector which has a correspondence with the identification data of each of the users, the interest vector being expressed by a parameter indicating the categorized interest information. The content retrieval request processing unit may determine the distance between the interest vector of the user registered in correspondence with the requesting peer device and the interest vector of another user registered in the user information database to sequentially extract users having shorter distances from the interest vector of the user registered in correspondence with the requesting peer device in the ascending order. The device search requesting unit may inquire about the presence or absence of the content in the peer devices in the order of the users extracted by the content retrieval request processing unit.

The user information database may store an interest vector which has a correspondence with the identification data of each of the users, the interest vector being expressed by a parameter indicating the categorized interest information. The content retrieval request processing unit may determine the distance between the interest vector of the user registered in correspondence with the requesting peer device and the interest vector of another user registered in the user information database to determine the vector lengths of users having an equal interest vector distance from the interest vector of the user registered in correspondence with the requesting peer device to sequentially extract users having greater vector lengths in the descending order. The device search requesting unit may inquire about the presence or absence of the content in the peer devices in the order of the users extracted by the content retrieval request processing unit.

The user information database may store an interest vector which has a correspondence with the identification data of each of the users, the interest vector being expressed by a parameter indicating the categorized interest information. The information processing device may further include a user interest managing unit. When a content retrieval is performed in response to a content retrieval request from one of the peer devices, the user interest managing unit may update the interest vector of the requesting user, whereby the distance between the interest vector of the requesting user and the interest vector of a user of one of the peer devices which provides the content is reduced.

The user information database may store an interest vector which has a correspondence with the identification data of each of the users, the interest vector being expressed by a parameter indicating the categorized interest information. The information processing device may further include a user interest managing unit. When a content retrieval in response to a content retrieval request from one of the peer devices is not performed for a predetermined time, the user interest managing unit may update the interest vector of the requesting user, whereby the distance between the interest vector of the requesting user and an initial interest vector of the requesting user which is initially registered in the user information database is reduced.

The content retrieval request processing unit may retrieve the interest information from the user information database based on the user identifier contained in the content retrieval request received from the requesting peer device, and may extract from the user information database a user having similar user interest information to the retrieved interest information. The content retrieval request processing unit may send the requesting peer device address information of one of the peer devices which is found by the content retrieval request processing unit and which provides the content.

The user information database may store an interest vector which has a correspondence with the identification data of each of the users, the interest vector being expressed by a parameter indicating the categorized interest information. The information processing device may further include a user information registration request processing unit. Upon receipt of user registration information from one of the peer devices, when the user registration information contains interest information, the user information registration request processing unit may register an interest vector based on the interest information in the user information database so as to have a correspondence with the identification data of each of the users. When the user registration information contains preference information, the user information registration request processing unit may convert a preference vector based on the preference information into the interest vector, and may register the converted interest vector in the user information database so as to have a correspondence with the identification data of each of the users.

In a fourth aspect of the present invention, a computer program executes a process in response to a content retrieval request from one of peer information processing devices connected to a network. The computer program includes a retrieving step of searching a user information database which stores, in correspondence with each other, interest information of users of the peer devices and identification data for identifying the users, the interest information including a degree of interest of the users in categorize interest information, and retrieving the interest information of a user registered in correspondence to the requesting peer device; a user extracting step of extracting from the user information database a user having similar interest information to the interest information retrieved in the retrieving step; and an inquiring step of inquiring about the presence or absence of the content in the peer device of the user extracted in the user extracting step.

The computer program according to the present invention may be a computer program which can be provided for a general-purpose computer system capable of executing various program codes by a computer-readable storage medium such as a CD, an FD, and an MO, or via a communication medium such as a network. The program in the computer-readable form enables processing to be executed on a computer system according to the program.

According to the present invention, therefore, for data retrieval on a peer-to-peer network, a control server configures an interest vector using a parameter indicating a degree of interest in various categories based on interest information or preference information of users of peer devices, and an interest vector similar to the interest vector of a requesting user is-selected to make an inquiry about the presence or absence of the content. Therefore, reliable content retrieval can be achieved without storing content information in the control server.

According to the present invention, furthermore, data can be retrieved based on user interest information on a peer-to-peer network without managing metadata for the content as content information. According to the present invention, furthermore, for data retrieval on a peer-to-peer network, a control server configures an interest vector using a parameter indicating a degree of interest in various categories based on interest information or preference information of users of peer devices, and the configured interest vector is updated under various conditions and stored in a database, thereby maintaining the accuracy of the interest information. Therefore, reliable content retrieval can be achieved.

According to the present invention, furthermore, for data retrieval on a peer-to-peer network, a control server obtains interest information or preference information of users of peer devices, and an interest vector similar to the interest vector of a requesting user is selected to make an inquiry about the presence or absence of the content. Therefore, reliable inquiries can be achieved, thus mitigating network traffic. The term system herein refers to a logical set of devices, which are not necessarily received in the same housing.

Additional features and advantages of the present invention are described in, and will be apparent from, the following Detailed Description of the Invention and the Figures.

BRIEF DESCRIPTION OF THE DRAWINGS

FIGS. 1A and 1B are schematic diagrams of peer-to-peer networks;

FIG. 3 is a table showing data stored in a content information database in the peer device in the data processing system according to the present invention;

FIG. 4 is table showing data stored in a user information database in the control server in the data processing system according to the present invention;

FIG. 7 is a table showing user information data registered in the control server in the data processing system according to the present invention;

FIG. 15 is a chart for illustrating a time-based interest vector updating process which is performed by the control server in the data processing system according to the present invention;

FIG. 16 is a flowchart showing a user interest information registration process performed by the control server in the data processing system according to the present invention.

DETAILED DESCRIPTION OF THE INVENTION

Figure 2:
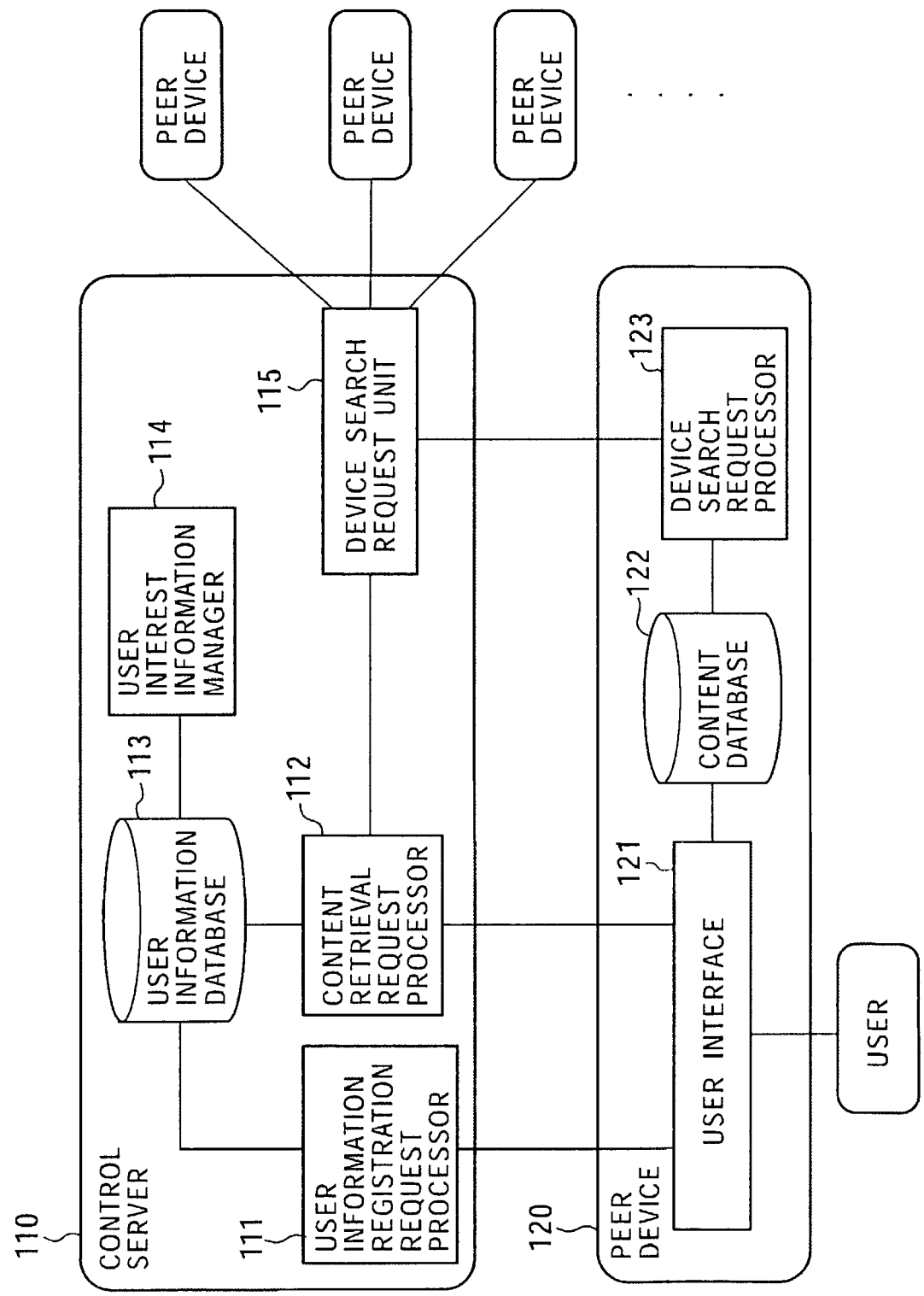
FIG. 2 is a block diagram of the configuration of a control server and a peer device in a data processing system according to the present invention.

The outline of a data processing system and data processing operation according to the present invention is now described with reference to FIG. 2. The data processing system shown in FIG. 2 includes a peer device 120 and a control server 110, in which data can be exchanged between the peer device 120 and the control server 110 over a communication network such as the Internet. Although a single peer device 120 is shown in FIG. 2, a plurality of peer devices are actually connected to the network.

The peer device 120 is an information processing device connected to a network forming a peer-to-peer (P2P) network, and may be a resource owned by a network client, including a personal computer (PC), a portable terminal, a PDA (personal digital assistant), a cellular telephone, and any other device having the communication capability or connected to a communication device, such as a disc device serving as a storage unit and a printer.

The peer device 120 includes a user interface 121, a content database 122, and a device search request processor 123. The control server 110 includes a user information registration request processor 111, a content retrieval request processor 112, a user information database 113, a user interest information manager 114, and a device search request unit 115.

In the peer device 120, the user interface 121 is a user interface through which a request for registering user interest information to the control server 110 or a request for content retrieval is sent. The content database 122 is a database for storing content information of the peer device 120. The content information includes a content identifier assigned to the content.

The content identifier is a global unique ID to the content, such as [Content ID: crid://broadcaster.co.jp;comedy/wibble]. This content ID is an example in the content ID format called content reference ID (CRID) specified by TV-Anytime (http://www.tv-anytime.org/). Any other format of content ID specified by another authority may be used.

FIG. 3 shows data in the content database 122. As shown in FIG. 3, the content database 122 stores an ID indicating a sequential number assigned to the content of the peer device 120, and a global unique content ID corresponding to the ID. The content of the peer device 120 can be identified based on the content ID stored in the content database 122 so that the content can be extracted.

The device search request processor 123 is a processor module for processing a device search request from the control server 110. When the peer device 120 receives a device search request from the control server 110, the device search request processor 123 accesses the content database 122 to determine whether or not the peer device 120 contains the requested content, and returns the result to the control server 110.

In the control server 110, the user information registration request processor 111 is a processor module for processing a user information registration request from the peer device 120 to register user information to the user information database 113. The content retrieval request processor 112 is a processor module for processing a content retrieval request from the peer device 120. Upon a content retrieval request from the peer device 120, the content retrieval request processor 112 accesses the user information database 113 to extract a possible user or peer device having the requested content based on the user interest information of a requesting user who issued the retrieval request.

The user information database 113 is a database for storing user information of users who use the peer devices connected to the network. The user information includes a user ID for identifying a user, an address of the user device, such as an IP address, and user interest information. The user interest information includes interest categories and parameters specified for the interest categories, and the parameters indicate a degree of interest at the present time (interest vector), and a degree of interest at the initial user information registration (initial interest vector).

FIG. 4 shows data in the user information database 113. As shown in FIG. 4, the user information database 113 stores an ID indicating a sequential number assigned to a user of a peer device managed by the control server 110, a user ID for identifying the user, an IP address of the user device, and user interest information. The user interest information is grouped into predetermined categories, and a degree of interest in each category is expressed by a vector value. In FIG. 4, the user interest information is categorized into "SPORTS" and "MUSIC"; and "SPORTS" is further categorized into "TENNIS" and "BASEBALL", and "MUSIC" is further categorized into "J-POP (Japanese pops)". These categories shown in FIG. 4 are merely illustrative, and a variety of categories may be available.

The parameters for the interest vector and initial interest vector indicate a degree of interest at the present time and a degree of interest at the initial registration, respectively, and each parameter is set to a value ranging from 0 to 10. A category in which a user has no interest has no value or a value of zero, and a category in which a user has the most interest has a value of ten. Such normalization prevents a difference in weighting between the parameters in each category. The initial interest vector once initially set at the initial registration is not updated in principle, while the interest vector indicating the present degree of interest is updated by user operation or as time elapses. Such processing is described below.

In FIG. 4, user A has a peer device having an IP address "10.1.1.1", and was interested in "J-POP" in "MUSIC" at the initial registration, while he is now interested in "TENNIS" in "SPORTS" as well. Also in FIG. 4, user D has two peer devices of IP addresses "10.4.4.1" and "10.4.4.2". Therefore, a single user may register a plurality of information processing devices as peer devices.

The interest vector registered in the user information database 113 is now described. The interest categories and users registered in the user information database 113 are independent, and a space defined by axes representing interest categories is referred to as an "interest space". Thus, n interest categories produce an n-dimensional interest space, where the interest vector is vector of n-dimensional array which is defined by a degree of interest in the n interest categories.

Figure 5:
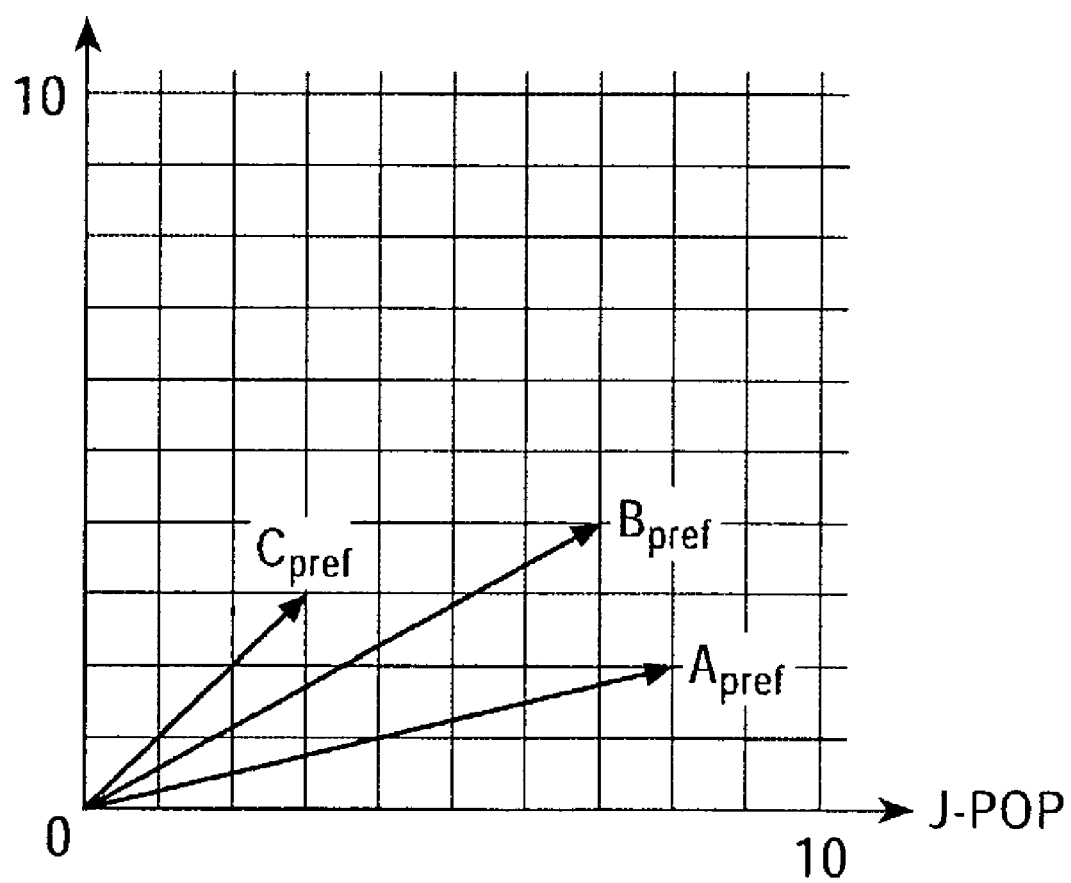
FIG. 5 is a plot for illustrating interest vectors based on user interest information managed by the control server in the data processing system according to the present invention.

FIG. 5 shows interest vectors of users A, B, and C in an interest space defined by two axes representing interest categories, for example, "BASEBALL" and "J-POP". In FIG. 5, the interest vectors of the users A, B, and C are indicated by $A_{pref}$, $B_{pref}$, and $C_{pref}$, respectively. In FIG. 5, given an interest vector indicated by ("J-POP", "BASEBALL"), the interest vectors of the users A, B, and C are expressed by $A_{pref}=(8, 2)$, $B_{pref}=(7, 4)$, $C_{pref}=(3, 3)$, respectively. If p1 indicates Category 1 (e.g., "TENNIS" in "SPORTS"), p2 indicates Category 2 ("BASEBALL"), p3 indicates "MUSIC" ("J-POP"), and p4 to pn indicate categories, an interest vector is given by the following expression:

$$\text{Interest Vector } X_{pref} = [p1, p2, \ldots pi, \ldots pn]^T \text{ for } 1 \leq i \leq n \quad \text{Eq. (1)}$$

Each of the interest vectors of the users A, B, and C in the user information database 113 as shown in FIG. 4 is vector of three dimensional array of p1 indicating Category 1 (e.g., "TENNIS" in "SPORTS"), p2 indicating Category 2 ("BASEBALL"), and p3 indicating "MUSIC" ("J-POP"), and is given by the following expressions:

$$A_{pref} = \begin{bmatrix} 7 \\ 2 \\ 8 \end{bmatrix}, B_{pref} = \begin{bmatrix} 1 \\ 4 \\ 7 \end{bmatrix}, C_{pref} = \begin{bmatrix} 0 \\ 3 \\ 3 \end{bmatrix} \quad \text{Eq. (2)}$$

In the control server 110 shown in FIG. 2, the user interest information manager 114 is a module for managing user interest information which may be time changing. The user interest information manager 114 allows the interest vector of each user approximate to the initial interest vector as time elapses. This operation is described in detail below. The device search request unit 115 is a processor module which makes an inquiry about the presence or absence of requested content in the peer devices connected to the network.

Figure 6:
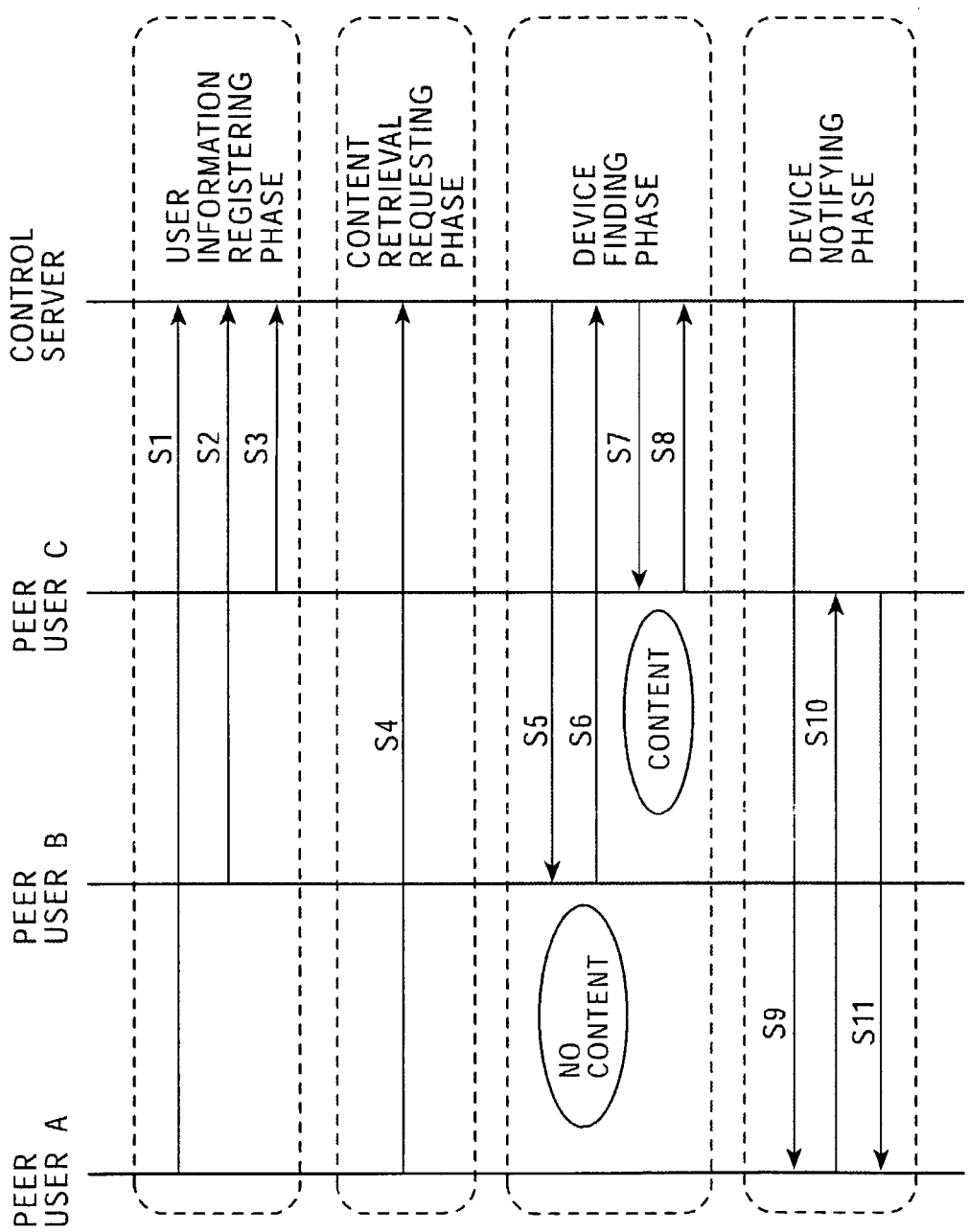
FIG. 6 is a chart for illustrating a processing sequence in the data processing system according to the present invention.

A data processing operation in the data processing system according to the present invention is now described in detail. FIG. 6 schematically shows a processing sequence of the data processing system in the present invention. In FIG. 6, the processing sequence is performed between the control server 110 and information processing devices of three users A, B, and C which are connected as peer nodes to a network, or is performed via the control server 110.

The data processing sequence in the data processing system according to the present invention includes the following phases:

(1) a user information registering phase;
(2) a content retrieval requesting phase;
(3) a device finding phase;
(4) a device notifying phase; and
(5) a user interest information managing phase.

In the user information registering phase, user information necessary for a user to use a peer-to-peer (P2P) network based data processing system is registered from each peer device 120 to the control server 110. The user information registered from each peer device 120 to the control server 110 includes a user ID, an address of the user device, such as an IP address, and user interest information. FIG. 7 shows the registered user information, by way of example. As described above, the user interest information includes interest categories and parameters specified for the interest categories. The parameter which is initially registered produces an initial interest vector.

In FIG. 7, user information of user A is registered, including a user ID of [User_A], an IP address of his peer device of [10.1.1.1], and user interest information having vector parameters of [3] for "TENNIS" in "SPORTS" and [2] for "BASEBALL" in "SPORTS", and [8] for "J-POP" in "MUSIC". This user information indicates that the user A has strong interest in "J-POP" in "MUSIC".

In the user information registering phase shown in FIG. 6, in step S1, the user A sends the information shown in FIG. 7 to the control server 110, and the control server 110 registers the received information in the user information database 113 shown in FIG. 2. In steps S2 and S3 in FIG. 6, the users B and C also register the respective user information. The user information is registered by a user input through the user interface 121 of the peer device 120 shown in FIG. 2. The user information registration request processor 111 in the control server 110 receives the information from the peer device 120, and registers the information to the user information database 113. Then, this phase ends. The values registered for each interest category in this phase form the initial interest vectors.

In the content retrieval requesting phase, a user who has registered user information in the user information registering phase sends a content retrieval request to the control server 110. Since the data processing system according to the present invention is a peer-to-peer (P2P) network based system, in which content is not reserved in the control server 110, the data stored in each peer device is to be retrieved. It is therefore required to extract a peer device which stores the requested content in order to retrieve the content. The control server 110 is only required for providing the information about the extracted peer device in response to a content retrieval request from a user.

In this content retrieval requesting phase, a user sends a content retrieval request to the control server 110 via his peer device 120. The content retrieval request is sent as a query having a content key for identifying the content and the user ID, which is entered by a user input via the user interface 121 of the peer device 120 shown in FIG. 2. The key is an ID unique to the content.

For example, the content retrieval request query sent from the peer device 120 to the control server 110 contains the following user ID and content ID:

user ID: User_A
content ID: crid://broadcaster.co.jp;comedy/wibble

This query data indicates that a content retrieval request query is defined by a global unique content reference ID (CRID) [crid://broadcaster.co.jp;comedy/wibble] and is sent from a peer device having a user ID [User_A]. In the sequence shown in FIG. 6, in step S4, the user A sends a content retrieval request query to the control server 110.

In the device finding phase, the control server 110 which has received the content retrieval request query from the peer device 120 causes the content retrieval request processor 112 to search the user information database 113 based on the user ID contained in the received query to extract the user interest information corresponding to that user ID as an interest vector, and to extract, as a possible user who has the requested content, at least another registered user having similar interest vector to the extracted interest vector. The control server 110 further causes the device search request unit 115 to output a content search request to the peer device 120 of the extracted at least one user.

The content search request output from the device search request unit 115 includes a global unique content reference ID. If a peer device which has received the content search request output from the device search request unit 115 does not have the requested content, message data indicating that this peer device does not have the requested content is returned as a negative reply message to the control server 110. Upon receipt of the negative reply message, the control server 110 issues a similar content search request to a peer device of another user having the next most similar interest vector to the interest vector of the requesting user who sent the retrieval request in the content retrieval requesting phase.

For example, the control server 110 sequentially issues a content search request to users having more similar interest vector to the interest vector of the requesting user in the descending order. Alternatively, the control server 110 may multicast content search requests to peer devices of a plurality of predetermined users having a similar interest vector to the interest vector of the requesting user.

Figure 8:
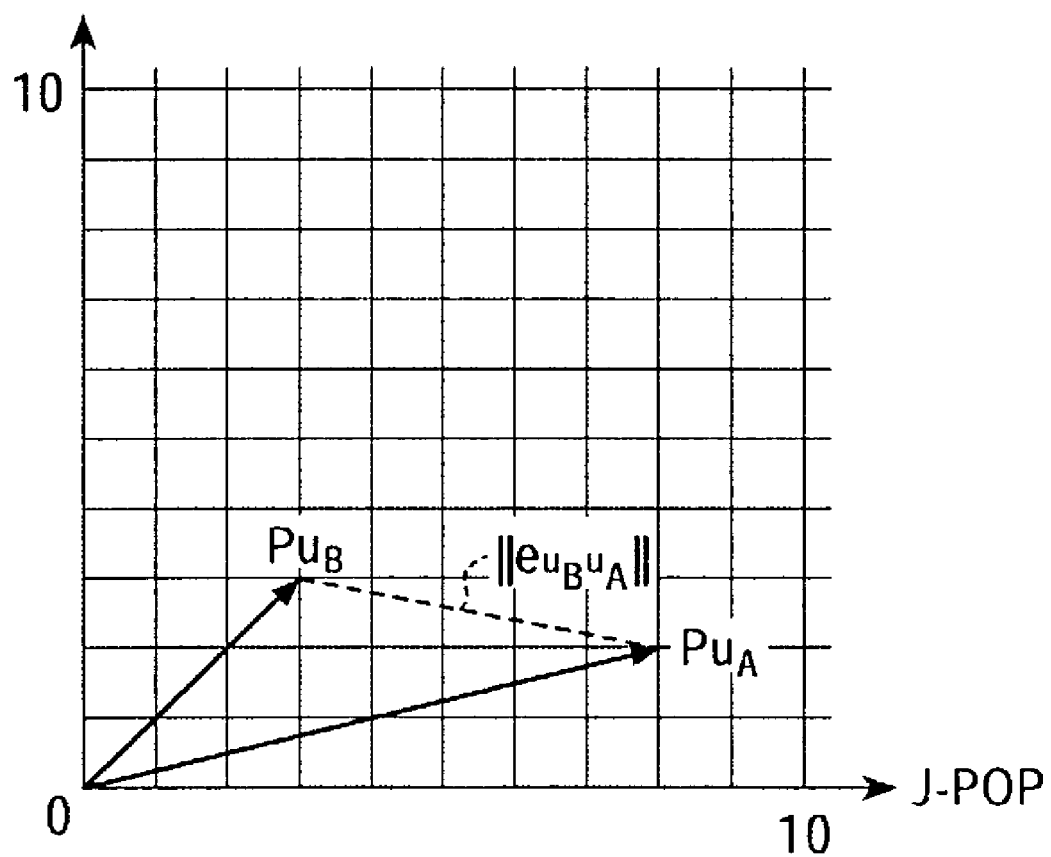
FIG. 8 is a plot for illustrating a process to determine the distance between interest vectors, which is performed by the control server in the data processing system according to the present invention.

A process for finding a user having similar interest vector to the interest vector of the requesting user, which is performed by the content retrieval request processor 112 in the control server 110, is now described. FIG. 8 illustrates that a user having a similar interest vector to the interest vector of the requesting user is found by determining the distance between the interest vector of the requesting user and the interest vector of another registered user. In FIG. 8, an interest space is defined by two axes representing interest categories, e.g., "BASEBALL" and "J-POP", in which the interest vector is vector of two-dimensional array. In FIG. 8, for example, if $Pu_A$ indicates the interest vector of a user A who issued a retrieval request in the content retrieval requesting phase, and $Pu_B$ indicates the interest vector of a user B to be determined for a vector distance, the distance between the vectors $Pu_A$ and $Pu_B$ is indicated by $\|e_{uBuA}\|$.

As a general expression to determine the distance between interest vectors, if the number of users to be searched is indicated by n, a searched user is indicated by ui (1≦i≦n), and the interest vector of the user ui is indicated by $Pu_i$, then, the distance $\|e_{uiuq}\|$ between an interest vector $Pu_q$ of a requesting user uq (i≠q) and the interest vector $Pu_i$ of the user ui is given by the following equation (3):

$$\|e_{uiuq}\| = \sqrt{(Pu_i - Pu_q, Pu_i - Pu_q)} \qquad \text{Eq. (3)}$$

where 1≦i≦n, and i≠q.

In the data processing system of the present invention, the terminology "possibly have the requested content" is substantially equivalent to "short distance between interest vectors". This means that searching a device which more possibly has the requested content is equivalent to searching for the content from a device of a user having more similar interest to that of the requesting user.

If the probability that a user $u_i$ has content to be requested by a user $u_q$ is indicated by $I_{uiuq}$, the probability $Iu_iu_q$ is given by the following equation (4) using the distance $\|e_{uiuq}\|$ between the interest vector $Pu_i$ and the interest vector $Pu_q$:

$$Iu_iu_q = 1/\|e_{uiuq}\| \qquad \text{Eq. (4)}$$

Figure 9:
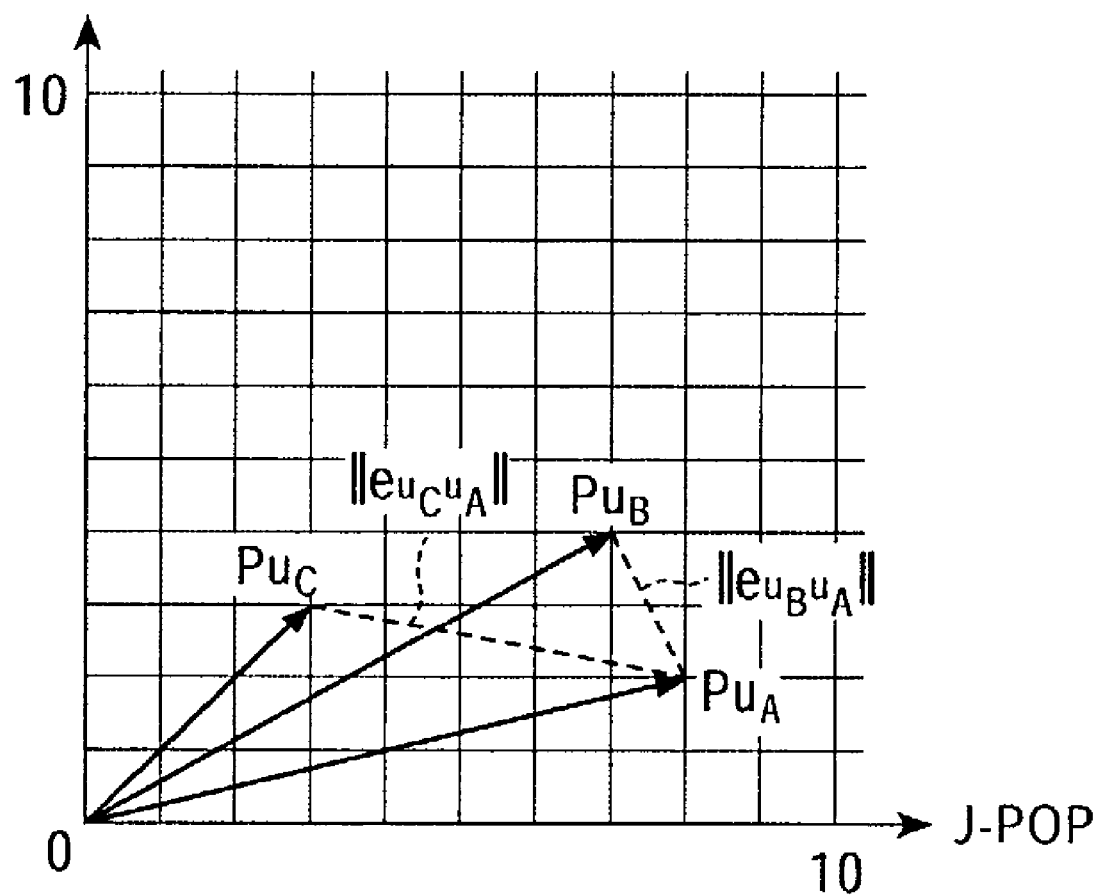
FIG. 9 is a plot for illustrating a process to determine the distance between interest vectors, which is performed by the control server in the data processing system according to the present invention.

A process for determining the order in which the control server 110 sequentially issues a content search request to users having a more similar interest vector to the interest vector of a requesting user who issued a retrieval request in the content retrieval requesting phase is described with reference to FIG. 9. FIG. 9 shows an interest space defined by two axes representing interest categories, e.g., "BASEBALL" and "J-POP", in which the interest vector is vector of two-dimensional array. In FIG. 9, for example, $Pu_A$ indicates the interest vector of a user A who issued a retrieval request in the content retrieval requesting phase, $Pu_B$ indicates the interest vector of a user B to be determined for a vector distance, and $Pu_C$ indicates the interest vector of a user C to be also determined for a vector distance. Then, in order to determine the order in which a content search request is issued, the distance $\|e_{uBuA}\|$ between the vector $Pu_A$ and the vector $Pu_B$ is compared to the distance $\|e_{uCuA}\|$ between the vector $Pu_A$ and the vector $Pu_C$, and it is determined that a user having a shorter vector distance from the user A is the user who has a more similar interest vector to that of the user A. Thus, a content search request is earlier issued to the peer device of that user.

In FIG. 9, given an interest vector indicated by ("J-POP", "BASEBALL"), the interest vectors of the users A, B, and C are expressed by $Pu_A=(8, 2)$, $Pu_B=(7, 4)$, $Pu_C=(3, 3)$, respectively. The probabilities that the users B and C have content to be requested by the user A are indicated by $I_{uBuA}$ and $I_{uCuA}$, respectively, the distance between the interest vector $Pu_A$ of the user A and the interest vector $Pu_B$ of the user B is given by $e_{uBuA}=Pu_B-Pu_A$, and the distance between the interest vector $Pu_A$ of the user A and the interest vector $Pu_C$ of the user C is given by $e_{uCuA}=Pu_C-Pu_A$.

Then, based on the parameters of interest vectors $Pu_A=(8, 2)$, $Pu_B=(7, 4)$, and $Pu_C=(3, 3)$ of the users A, B, and C, respectively, the interest vector distance $\|e_{uBuA}\|$ between the users A and B, the interest vector distance $\|e_{uCuA}\|$ between the users A and C, and the probabilities $I_{uBuA}$ and $I_{uCuA}$ are determined by the following equations (5) to (8), respectively:

$$\|e_{uBuA}\| = \sqrt{(Pu_B - Pu_A, Pu_B - Pu_A)} = \sqrt{\left(\begin{bmatrix}7\\4\end{bmatrix}-\begin{bmatrix}8\\2\end{bmatrix},\begin{bmatrix}7\\4\end{bmatrix}-\begin{bmatrix}8\\2\end{bmatrix}\right)} \qquad \text{Eq. (5)}$$

$$= \sqrt{(-1)^2 + (2)^2} = \sqrt{5} = 2.236$$

$$\|e_{uCuA}\| = \sqrt{(Pu_C - Pu_A, Pu_C - Pu_A)} = \sqrt{\left(\begin{bmatrix}3\\3\end{bmatrix}-\begin{bmatrix}8\\2\end{bmatrix},\begin{bmatrix}3\\3\end{bmatrix}-\begin{bmatrix}8\\2\end{bmatrix}\right)} \qquad \text{Eq. (6)}$$

$$= \sqrt{(-5)^2 + (1)^2} = \sqrt{26} = 5.099$$

$$I_{uBuA} = \frac{1}{\|e_{uBuA}\|} = \frac{1}{2.236} = 0.447 \qquad \text{Eq. (7)}$$

$$I_{uCuA} = \frac{1}{\|e_{uCuA}\|} = \frac{1}{5.099} = 0.196 \qquad \text{Eq. (8)}$$

Based on $I_{uBuA}>I_{uCuA}$ from Equations (7) and (8), it is determined that the user B has a more similar interest vector to the interest vector of the user A than the user C. It is therefore determined that the user B more probably has content to be requested by the user A, so that a search request is issued from the control server 110 to the user B followed by the user C.

In the above-described processing, the users B and C have different interest vector distances from the user A, and it is therefore useful to determine the order for the sequence based on the interest vector distance. However, the users B and C may sometimes have an equal interest vector distance from the user A. A process for determining the order for the sequence in the latter case is now described with reference to FIG. 10.

Figure 10:
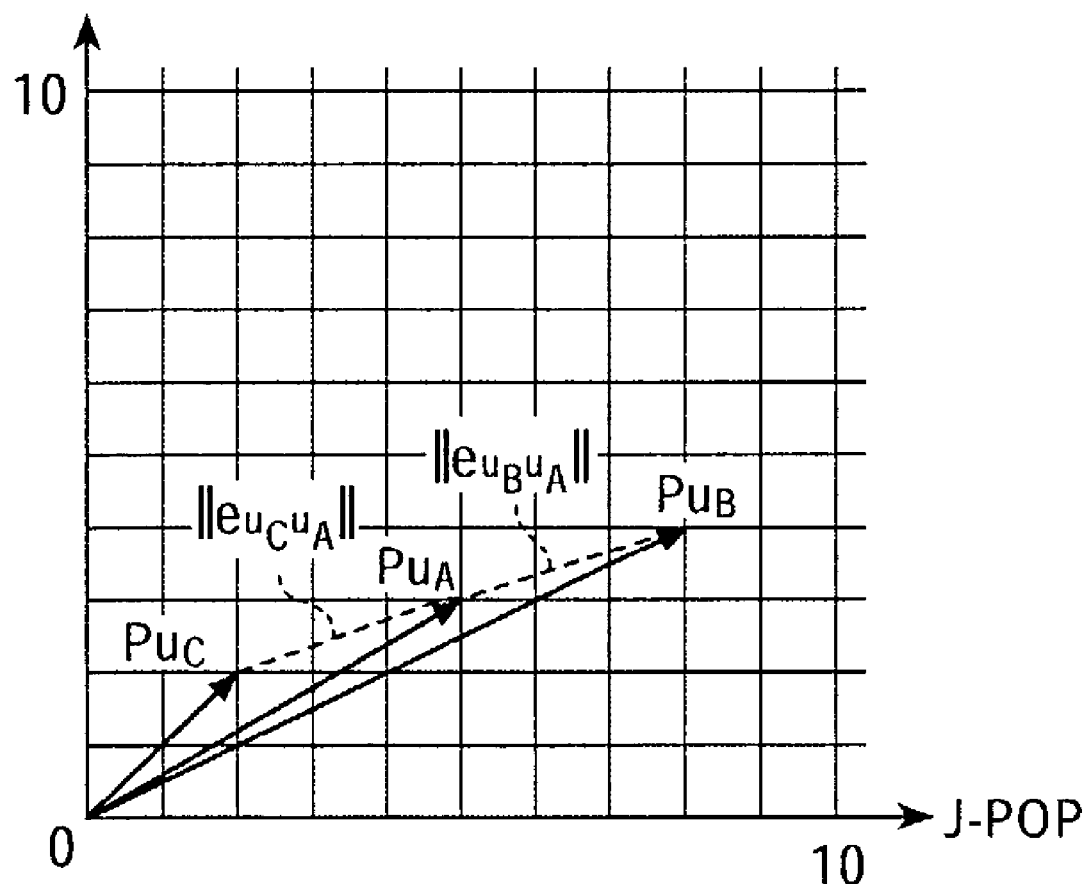
FIG. 10 is a plot for illustrating a modified process to determine the distance between interest vectors, which is performed by the control server in the data processing system according to the present invention.

FIG. 10 also shows an interest space defined by two axes representing interest categories "BASEBALL" and "J-POP", in which the interest vector is vector of two-dimensional array. In FIG. 10, for example, $Pu_A$ indicates the interest vector of a user A who issued a retrieval request in the content retrieval requesting phase, $Pu_B$ indicates the interest vector of a user B to be determined for a vector distance, and $Pu_C$ indicates the interest vector of a user C to be also determined for a vector distance. In order to determine the order in which a content search request is issued, the distance $\|e_{uBuA}\|$ between the vector $Pu_A$ and the vector $Pu_B$ is compared to the distance $\|e_{uCuA}\|$ between the vector $Pu_A$ and the vector $Pu_C$, with the result that both distances are equal, that is, $\|e_{uBuA}\|=\|e_{uCuA}\|$ in FIG. 10.

In the case where there is an equal distance between the interest vector of a requesting user and the interest vectors of a plurality of users, the search request issuing sequence is first performed on the interest vector which is the largest distance from the origin (0, 0) in the interest space. That is, it is thought that the device of a user having a greater degree of interest has more probably the requested content, so that the sequence is performed prior on the interest vector having a greater degree of interest, or a greater distance from the origin (0, 0), that is, having a longer vector length.

Therefore, the magnitude (vector length) of interest vectors of a plurality of users having an equal interest vector distance from a requesting user is considered in order to determine the order in which the content retrieval request processor 112 in the control server 110 issues a search request to a user having a more similar interest vector to the interest vector of the requesting user. The magnitude (vector length) of the interest vector of a user Ui is indicated by $\|P_{Ui}\|$.

The probability $IP_{uiuq}$ that the user Ui has content to be requested by a user Uq is given by the following equation (9) using the distance $\|e_{uiuq}\|$ between the interest vector $P_{Ui}$ and the interest vector $P_{Uq}$:

$$IP_{uiuq} = \|P_{Ui}\|/\|e_{uiuq}\| \quad \text{Eq. (9)}$$

In FIG. 10, given an interest vector indicated by ("J-POP", "BASEBALL"), the interest vectors of the users A, B, and C are expressed by $Pu_A=(5, 3)$, $Pu_B=(8, 4)$, $Pu_C=(2, 2)$, respectively. The probabilities that the users B and C have content to be requested by the user A are indicated by $IP_{uBuA}$ and $IP_{uCuA}$, respectively, the distance between the interest vector $Pu_A$ of the user A and the interest vector $Pu_B$ of the user B is given by $e_{uBuA}=Pu_B-Pu_A$, and the distance between the interest vector $Pu_A$ of the user A and the interest vector $Pu_C$ of the user C is given by $e_{uCuA}=Pu_C-Pu_A$.

Then, based on the parameters of the interest vectors $Pu_A=(5, 3)$, $Pu_B=(8, 4)$, and $Pu_C=(2, 2)$ of the users A, B, and C, respectively, the interest vector distance $\|e_{uAuB}\|$ between the users A and B, the interest vector distance $\|e_{uCuA}\|$ between the users A and C, the magnitude $\|P_{uB}\|$ of the interest vector $Pu_B$ of the user B, the magnitude $\|P_{uC}\|$ of the interest vector $Pu_C$ of the user C, and the probabilities $IP_{uBuA}$ and $IP_{uCuA}$ are determined by the following equations (10) to (15), respectively:

$$\|e_{uBuA}\| = \sqrt{(Pu_B - Pu_A, Pu_B - Pu_A)} = \sqrt{\left(\begin{bmatrix}8\\4\end{bmatrix}-\begin{bmatrix}5\\3\end{bmatrix},\begin{bmatrix}8\\4\end{bmatrix}-\begin{bmatrix}5\\3\end{bmatrix}\right)}$$
$$= \sqrt{(3)^2 + (1)^2} = \sqrt{10} = 3.162 \quad \text{Eq. (10)}$$

$$\|e_{uCuA}\| = \sqrt{(Pu_C - Pu_A, Pu_C - Pu_A)} = \sqrt{\left(\begin{bmatrix}2\\2\end{bmatrix}-\begin{bmatrix}5\\3\end{bmatrix},\begin{bmatrix}2\\2\end{bmatrix}-\begin{bmatrix}5\\3\end{bmatrix}\right)}$$
$$= \sqrt{(-3)^2 + (-1)^2} = \sqrt{10} = 3.162 \quad \text{Eq. (11)}$$

$$\|P_{uB}\| = \sqrt{(Pu_B, Pu_B)} = \sqrt{\left(\begin{bmatrix}8\\4\end{bmatrix},\begin{bmatrix}8\\4\end{bmatrix}\right)} = \sqrt{(8)^2 + (4)^2} = \sqrt{80} = 8.944 \quad \text{Eq. (12)}$$

$$\|P_{uC}\| = \sqrt{(Pu_C, Pu_C)} = \sqrt{\left(\begin{bmatrix}2\\2\end{bmatrix},\begin{bmatrix}2\\2\end{bmatrix}\right)} = \sqrt{(2)^2 + (2)^2} = \sqrt{8} = 2.828 \quad \text{Eq. (13)}$$

$$IP_{uBuA} = \frac{\|P_{uB}\|}{\|e_{uBuA}\|} = \frac{8.944}{3.162} = 2.829 \quad \text{Eq. (14)}$$

$$IP_{uBuA} = \frac{\|P_{uC}\|}{\|e_{uCuA}\|} = \frac{2.828}{3.162} = 0.894 \quad \text{Eq. (15)}$$

Based on $I_{uBuA}>I_{uCuA}$ from Equations (14) and (15), it is determined that the user B has a greater interest vector than the user C although the distance between the interest vector of the user B and the interest vector of the user A is equal to the distance between the interest vector of the user C and the interest vector of the user A. It is therefore determined that the user B more probably has content to be requested by the user A, so that a search request is issued from the control server 110 to the user B followed by the user C. Accordingly, when a user having a peer device to be searched is determined based on the distance from the interest vector of a requesting user who issued a retrieval request to the control server 110, if a plurality of users having an equal interest vector distance from the interest vector of the requesting user, a search request is earlier issued to a user having a longer interest vector.

In the device finding phase in the sequence shown in FIG. 6, the peer devices of the users B and C are selected as user devices to which a search request is issued, based on the above-described determination of interest vector distance, and a search request is issued to the user B followed by the user C based on the interest vector distance or vector length. In step S5, a search request including a global unique content reference ID such as [crid://broadcaster.co.jp;comedy/wibble] which is contained in the retrieval request query received in the content retrieval requesting phase is sent to the peer device of the user B.

When the peer device of the user B receives the search request from the control server 110, the device search request processor 123 shown in FIG. 2 searches the content database 122 based on the received content ID to determine whether or not the searched content is stored in the content database 122. If the searched content is not stored, in step S6 shown in FIG. 6, a negative reply indicating that the searched content cannot be provided is sent to the control server 110.

Upon receipt of the negative reply from the peer device of the user B, the control server 110 selects the next peer device to which a search request is issued. This selection is performed according to the sequence determined based on the above-described way, i.e., based on the interest vector distance or the vector length. In FIG. 6, a search request is next issued to the peer device of the user C. Then, in step S7, a search request including the global unique content ID contained in the retrieval request query received from the peer device of the user A in the previous content retrieval requesting phase is sent to the peer device of the user C.

When the peer device of the user C receives the search request from the control server 110, the device search request processor 123 shown in FIG. 2 searches the content database 122 based on the received content ID to determine whether or not the requested content is stored in the content database 122. If the requested content is stored, in step S8 shown in FIG. 6, an affirmative reply indicating that the requested content can be provided is sent to the control server 110.

When a device having the requested content is found in the device finding phase, then, in the device notifying phase, the content retrieval request processor 112 in the control server 110 sends information about the found device to a requesting peer device which issued the content retrieval request to the control server 110 in the content retrieval requesting phase. In step S9 in FIG. 6, address information of the peer device of the user C which sent the affirmative reply indicating that the requested content can be provided in the device finding phase is sent from the control server 110 to the peer device of the user A which issued the content retrieval request to the control server 110 in the content retrieval requesting phase.

In step S10, the peer device of the user A which has received the address information of the peer device of the user C from the control server 110 sends a content request including the content ID to the peer device of the user C. In step S11, the peer device of the user C which has received the content request from the peer device of the user A extracts the requested content from the content database 122 based on the content ID, and sends the content to the peer device of the user A.

Figure 11:
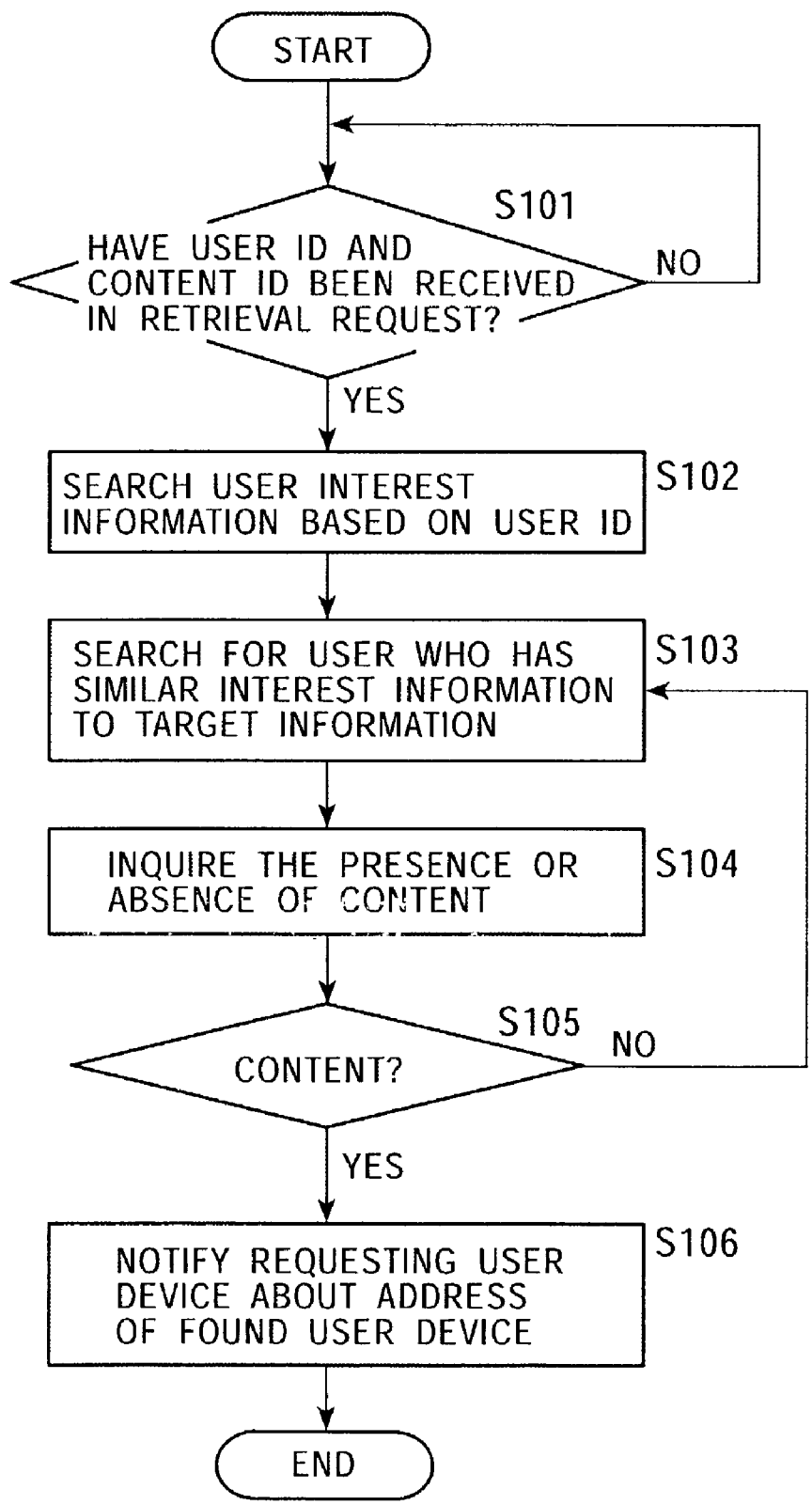
FIG. 11 is a flowchart showing a routine executed by the control server in the data processing system according to the present invention.
Figure 12B:
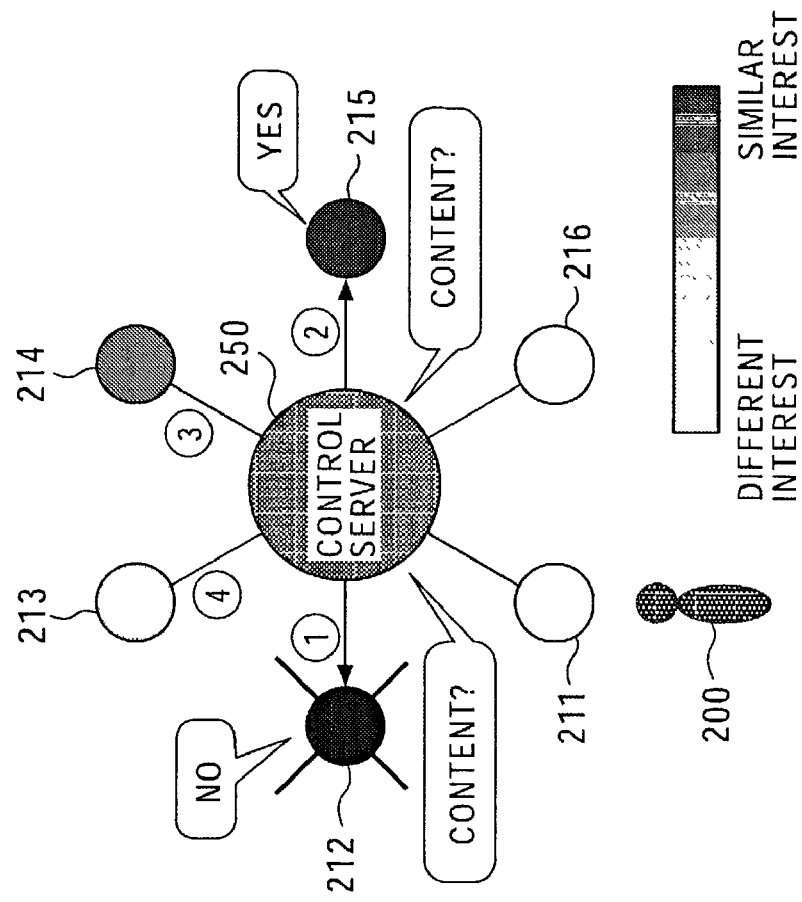
FIGS. 12A and 12B are schematic diagrams for illustrating a content retrieval process using the distance between interest vectors which is executed by the control server in the data processing system according to the present invention.
Figure 12A:
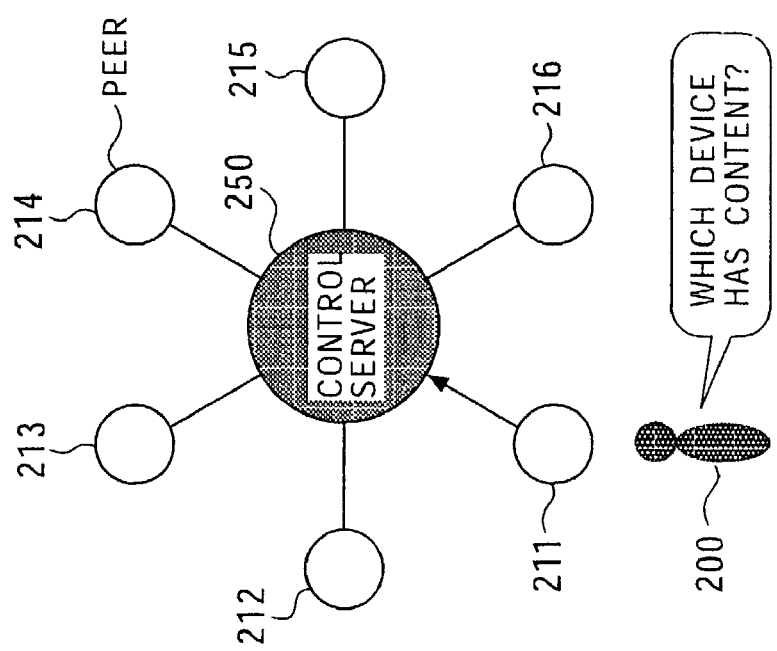

FIG. 11 is a flowchart showing the routine in the above-described content retrieval which is executed by the control server 110 shown in FIG. 2. The routine is now described step by step with reference to the flowchart of FIG. 11 in conjunction with FIGS. 12A and 12B. In step S101, it is determined whether or not a content retrieval request has been received from a peer device. If the content retrieval request has been received, the routine proceeds to step S102. As described above, the content retrieval request includes a user ID and a content ID. FIGS. 12A and 12B are schematic diagrams showing that a content retrieval request is issued from a peer device 211 of a user 200 to a control server 250.

In step S102, the control server 250 searches an internal user information database (the user information database 113 shown in FIG. 2; also see FIG. 4) based on the user ID contained in the received content retrieval request to extract interest vector parameters as interest information data of a requesting user. In step S103, based on the above-described determination of interest vector distance, a user having a short interest vector distance from the requesting user is extracted. In this process, a sequence for inquiring about the presence or absence of the requested content in a peer device is also performed based on the interest vector distance or the vector length.

In FIGS. 12A and 12B, inquiries about the presence or absence of the requested content in a peer device 212, a peer device 215, a peer device 214, and a peer device 213 are made in the stated order. This order is an ascending order of peer devices of users having a shorter interest vector distance from the interest vector of the user 200. An inquiry about the presence or absence of the requested content in peer device 216 is not made, as further illustrated in FIG. 12B.

In step S104, a search request for inquiring about the presence or absence of the requested content is sent from the control server 250 to the peer devices according to the inquiry sequence determined in step S103. This search request includes the content ID stored in the retrieval request that has been received by the control server 250 from the requesting peer device 211. In step S105, the control server 250 receives either an affirmative reply or a negative reply for determining the presence or absence of the requested content from a peer device. If the negative reply is received, the inquiry is made on the next peer device according to the sequence determined in the previous step. If a peer device having the requested content is found, the routine proceeds to step S106, in which the address of the peer device found in step S105 is notified to the peer device 211 of the requesting user 200.

As shown in FIG. 12B, inquiries about the presence or absence of the requested content in the peer device 212, the peer device 215, the peer device 214, and the peer device 213 are made in the stated order; and, first, a negative reply is sent from the peer device 212 to the control server 250, and, then, an affirmative reply is sent from the peer device 215 to the control server 250. In this case, the control server 250 notifies the peer device 211 about the address of the peer device 215, and, upon receipt of the address, the peer device 211 sends a content request to the peer device 215, thus ensuring that the peer device 211 retrieves the requested content from the peer device 215.

The foregoing embodiment has been described in the context of data retrieval processing over a peer-to-peer network. As anticipated from the foregoing description, the data processing system according to the present invention allows a peer device to be chosen based on an interest vector as user interest information. Specifically, a peer device is selected on the basis of the concept that the peer device of a user having a more similar interest vector to the interest vector of a requesting user who issued a retrieval request has more probable content to be requested by the requesting user.

However, users may often turn their interest from one event to another as time elapses. Then, a process for updating interest vector (parameters) registered in the user information database 113 in the control server 110 so as to reflect the user turning his interest from one event to another is described below. This updating process is performed by the user interest information manager 114 in the control server 110 shown in FIG. 2. As previously described with reference to FIG. 4, an interest vector and an initial interest vector are registered in the user information database 113. The initial interest vector once registered at the initial registration is not updated in principle, while the interest vector is updated. A process for updating the interest vector is described below.

As anticipated from the description of the foregoing embodiment, in the data processing system of the present invention, a user device having a similar interest vector to the interest vector of a requesting user device which issues a content retrieval request is substantially equivalent to a user device having more probably the requested content. Thus, when the requesting user retrieves the requested content from a peer device which is extracted by the control server 110 based on comparison between the interest vectors, it is determined that the requesting user and a user of the extracted peer device have similar interest, and the interest vector updating process is performed so as to make the interest vector of the requesting user approximate to the interest vector of the user of the found peer device.

This interest vector updating process reduces the distance between the interest vectors of users A and B having the same content. After the interest vector updating process, for example, if one user, e.g., user A, requests a content retrieval, the peer device of the other user or user B can be set to higher priority in the inquiry sequence which is performed based on the interest vector distance by the control server 110 than before the interest vector updating process. Specifically, the peer device of the user B is set to a higher order in the inquiry sequence. Thus, "a deviation in category between the interest vector and the content" can be reduced. Therefore, the content retrieval efficiency can be improved.

Figure 13:
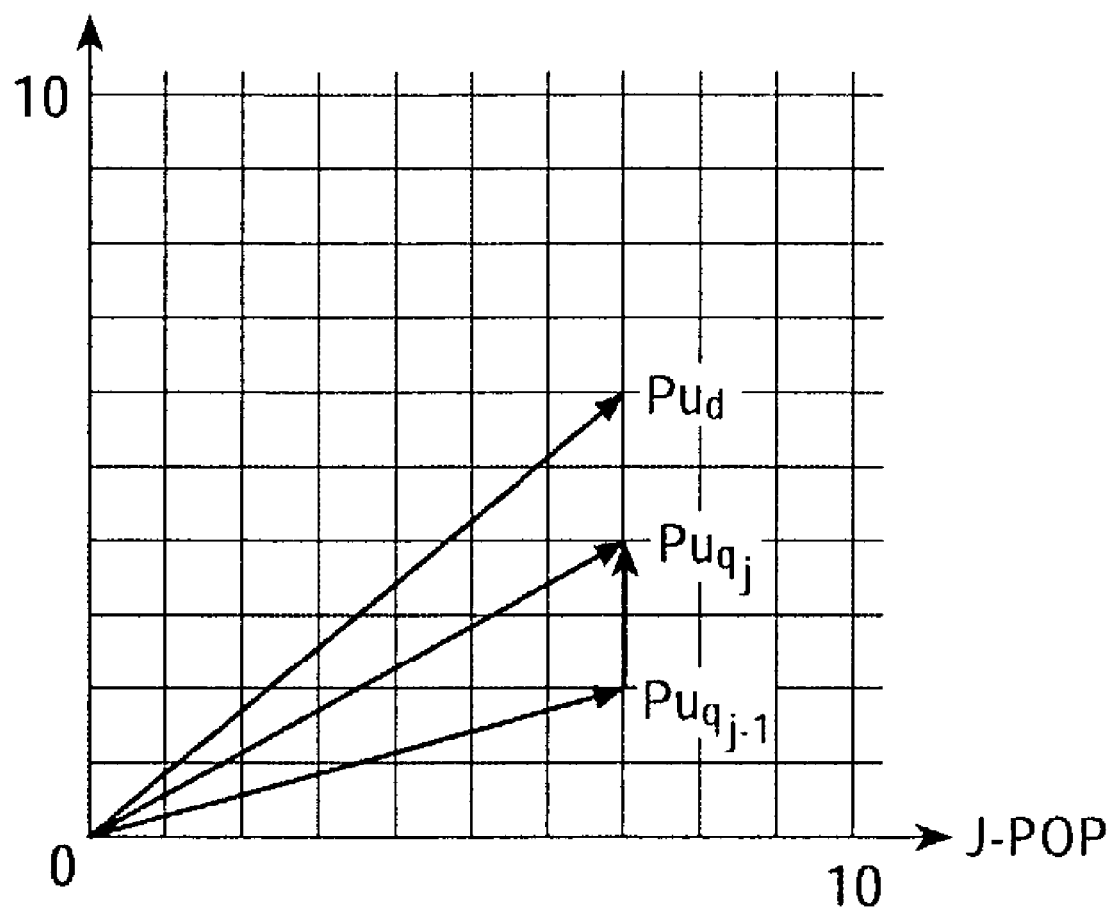
FIG. 13 is a plot for illustrating an interest vector updating process performed by the control server in the data processing system according to the present invention.

A specific example of the interest vector updating process is now described with reference to FIG. 13. In FIG. 13, the interest vector of a requesting user uq which has not been updated is indicated by $Puq_{j-1}$, the interest vector of a content providing user ud is indicated by Pud, and the interest vector of the requesting user uq which has been updated is indicated by $Puq_j$. In this example, when the requesting user uq retrieves the content from the peer device of the user ud in the j-th content retrieval request, the interest vector of the requesting user uq is updated.

As seen from FIG. 13, the interest vector $Puq_{j-1}$ of the requesting user uq is updated so as to halve the distance between the interest vector $Puq_{j-1}$ and the interest vector Pud of the content providing user ud, resulting in the interest vector $Puq_j$ which has been updated. In this example, the distance between the interest vector $Puq_j$ of the requesting user uq which has been updated and the interest vector Pud of the content providing user ud is a half of the distance between the interest vector $Puq_{j-1}$ of the requesting user uq which has not been updated and the interest vector Pud of the content providing user ud. However, the rate by which the interest vector distance is reduced may be arbitrarily set.

As a general expression of the interest vector updating process, if a requesting user uq having an interest vector $Puq_{j-1}$ retrieves content in j-th content retrieval request from a user ud having an interest vector Pud, the interest vector $Puq_j$ of the requesting user uq which has been updated is given by the following equation (16):

$$Puq_j = k(Pud - Puq_{j-1}) + Puq_{j-1} \text{ for } 1 \leq j \text{ and } 0 \leq k \leq 1 \qquad \text{Eq. (16)}$$

where k denotes the approximate coefficient. If k is 0, the interest vector of the requesting user is unchanged and does not approximate to the interest vector of the found user. If k is 1, the interest vector of the requesting user is equal to the interest vector of the found user. FIG. 13 shows the case where k=½.

In this interest vector updating process, however, if the interest vector of a requesting user approximates to the interest vector of a content providing user in a straightforward way, the other interest vector parameters of the requesting user may also be changed. This phenomenon is described with reference to FIGS. 14A and 14B. For example, in FIG. 14A, the interest vector of a requesting user uq which has not been updated is indicated by $Puq_{j-1}$, the interest vector of a content providing user ud is indicated by Pud, and the interest vector of the requesting user uq which has been updated is indicated by $Puq_j$. In this example, when the requesting user uq retrieves the content from the peer device of the user ud in the j-th content retrieval request, the interest vector of the requesting user uq is updated.

Figure 14A:
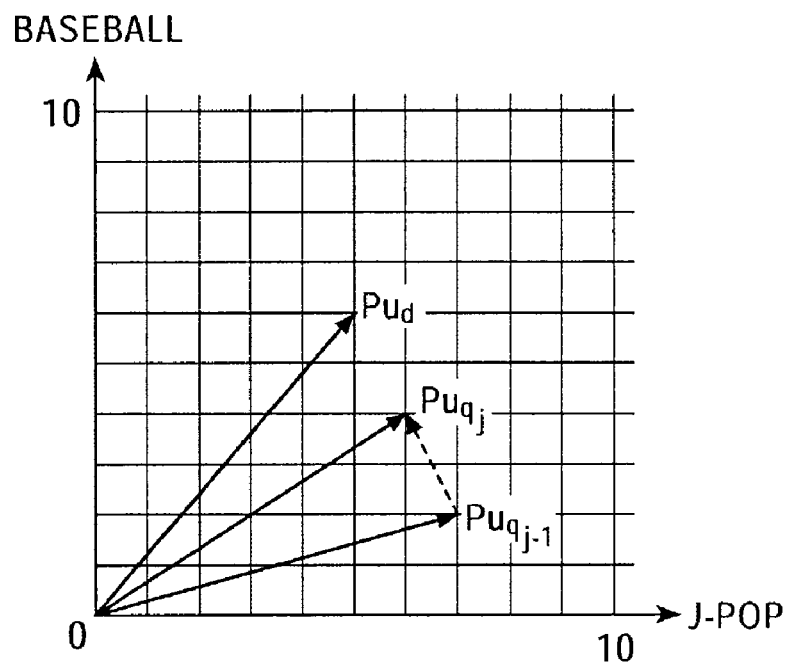
FIGS. 14A and 14B are plots for illustrating another interest vector updating process performed by the control server in the data processing system according to the present invention.

As seen from FIG. 14A, the interest vector $Puq_{j-1}$ of the requesting user uq is updated so as to halve the distance between the interest vector $Puq_{j-1}$ and the interest vector Pud of the content providing user ud, resulting in the interest vector $Puq_j$ which has been updated. It is assumed that the requesting user uq retrieves the content of "BASEBALL" from the content providing user ud. The content providing user ud has strong interest in baseball, and lower interest in the other "J-POP" than the requesting user uq. Specifically, given interest vector indicated by ("J-POP", "BASEBALL"), the interest vector of the content providing user ud is (5, 6), while the interest vector of the requesting user uq before the updating process is (7, 2).

Now, if the interest vector of the requesting user uq is updated in the way described above, the updated interest vector of the requesting user uq as indicated by ("J-POP", "BASEBALL") is set to (6, 4), thus indicating that the requesting user uq is loosing interest in "J-POP". In general, even when someone turns his interest from a first event to a second event, it is not thought that he completely looses interest in the first event. Furthermore, it is not efficient in search to direct the interest vector from a user device having actually the requested content to another device.

Figure 14B:
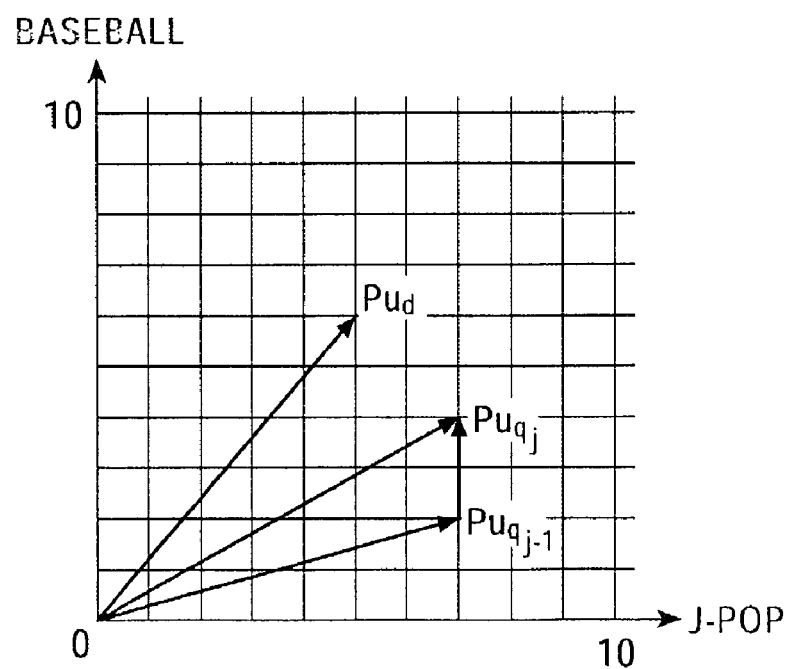

Therefore, in order to prevent any element in the updated vector from decreasing the parameter with respect to the vector which has not been updated, elements in the interest vector of the requesting user are compared to those in the interest vector of the content providing user, and any element in the interest vector of the requesting user which normally decreases after the updating process would be replaced by the original one. FIG. 14B illustrates this process.

In FIG. 14B, given interest vector indicated by ("J-POP", "BASEBALL"), the interest vector of the content providing user ud is (5, 6), and the interest vector of the requesting user uq before the updating process is (7, 2). Normally, given interest vector indicated by ("J-POP", "BASEBALL"), the interest vector of the requesting user uq after the updating process would be (6, 4); however, the above-described updating process, in which the original vector values of "J-POP" is unchanged in the interest vector, allows the interest vector of the requesting user uq indicated by ("J-POP", "BASEBALL") to be set to (7, 4). In the interest vector of the requesting user uq, therefore, a degree of interest in "J-POP" is unchanged and maintained.

As a general expression of this updating process shown in FIG. 14B, if the number of interest categories is indicated by m and the interest vector of each user is vector of m-dimensional array, the updated interest vector $Puq_j$ of the requesting user uq which retrieves the content in the j-th content retrieval request is vector of m-dimensional array given by the following equation (17):

$$\text{Interest vector: } Puq_j = [P_{q1j}, P_{q1j}, \ldots P_{qmj}]^T \text{ or } 1 \leq l \leq n \qquad \text{Eq. (17)}$$

When the requesting user uq having interest vector $Puq_{j-1}$ retrieves the content from another user ud having interest vector Pud in the j-th content retrieval request, the updated interest vector $Puq_j$ of the requesting user $u_q$ is determined by the following equation (18):

$$Pu_{qj} = k \begin{bmatrix} P_{dl} - P_{qlj-1} \\ \ldots \\ P_{dl} - P_{qlj-1} \\ \ldots \\ P_{dm} - P_{qmj-1} \end{bmatrix} + \begin{bmatrix} P_{qlj-1} \\ \ldots \\ P_{qlj-1} \\ \ldots \\ P_{qmj-1} \end{bmatrix}$$

for $1 \leq j$ and $0 \leq k \leq 1$ where if $p_{dl} - p_{qlj-1} < 0$, then $p_{dl} - p_{qlj-1} = 0$ \qquad Eq. (18)

where k denotes the approximate coefficient. If k is 0, the interest vector of the requesting user is unchanged and does not approximate to the interest vector of the found user. If k is 1, the interest vector of the requesting user is equal to the interest vector of the found user. FIG. 14B shows the case where k=½.

In the data processing system of the present invention, if a user has interest in a category, the user frequently searches for and retrieves content relating to the category. Conversely, if a user does not search for and retrieve the content, the user looses interest in the category. If a user frequently searches for and retrieves content based on interest vector, the interest vector is updated according to a degree of interest according to the above-described interest vector updating process. Meanwhile, if the content is not searched for and retrieved for a long period, it is thought that the updated interest vector is not reliable. Therefore, another interest vector updating process is performed in order to make the present interest vector of a user approximate to the initial interest vector indicating the initial interest of the user as a predetermined time elapses. This time-based interest vector updating process is described with reference to FIG. 15.

In FIG. 15, the interest vector of a requesting user uq which has not been updated is indicated by $Puq_{j-1}$, the initial interest vector of the requesting user uq is indicated by $Puq_0$, and the interest vector of the requesting user uq which has been updated as time t elapses is indicated by $Puq_{jt}$. FIG. 15 shows a process for updating the interest vector of the requesting user uq in the case where the requesting user uq does not request a content retrieval for a predetermined threshold time t after the j-th content retrieval request.

As seen from FIG. 15, the interest vector $Puq_j$ of the requesting user uq is updated so as to halve the distance between the interest vector $Puq_j$ and the initial interest vector $Puq_0$ of the requesting user uq, resulting in the interest vector $Puq_{jt}$ which has been updated. In this example, the distance between the interest vector $Puq_{jt}$ of the requesting user uq which has been updated and the initial interest vector $Puq_0$ of the requesting user uq is a half of the distance between the interest vector $Puq_j$ of the requesting user uq which has not been updated and the initial interest vector $Puq_0$ of the requesting user uq. However, the rate by which the interest vector distance is reduced may be arbitrarily set. The time t indicates a threshold time which is preset by the control server 110 as an elapsed time from the last content retrieval request.

As a general expression of this time-based interest vector updating process, if a requesting user uq having interest vector $Puq_j$ does not request a retrieval request for a threshold time t which is set by the control server 110, the interest vector $Puq_{jt}$ which has been updated is determined by the following equation (19):

$$Puq_{jt} = r(Puq_0 - Puq_j) + Puq_j \text{ for } 1 \leq j, \text{ and } r = wt \text{ where } 0 \leq w \leq 1$$ Eq. (19)

where r denotes the approximate coefficient, and w denotes a degree of changing. If r=0, that is, w=0, the interest vector of the requesting user is unchanged and does not approximate to the initial interest vector by the updating process. If r=1, the interest vector of the requesting user is updated so as to match the initial interest vector according to the updating process. FIG. 15 shows the case where r=½.

The foregoing embodiment has been described in the context of a data processing system in which an interest vector of each user is defined in an interest space on the basis of a degree of interest of each user in various categories. However, the present invention is not limited to this form. A preference vector whose parameter is defined based on user preference to various categories may be used. In this case, the control server 110 may register a preference vector of each user in the user information database 113, and the distance between the preference vectors registered in the user information database 113 is determined in response to a content retrieval request from a peer device of a user to select a peer device to be searched for the requested content.

For example, in a similar way to an interest vector described above, n categories are set, and parameters for each of the categories are set on the basis of user preference to each category. Then, preference vector V (v1, v2, . . . , vn) is generated based on the set parameters, where $-1 \leq vi \leq 1$ and $1 \leq i \leq n$, and the distance between preference vectors is determined in the way described above with respect to determination of the interest vector distance to select a peer device to be searched for requested content. In the preference vector, a parameter having a smaller value indicates "less preferable" and a parameter having a greater value indicates "more preferable". Alternatively, the control server 110 may set parameters for each category on the basis of user preference to generate preference vector V (v1, v2, . . . , vn) based on the set parameters, where $-1 \leq vi \leq 1$ and $1 \leq i \leq n$, and may generate interest vector P (p1, p2, . . . , pn) based on the generated preference vector V (v1, v2, . . . , vn).

As described above, if the preference vector is defined such that a parameter having a smaller value indicates "less preferable" and a parameter having a greater value indicates "more preferable", the term "more preferable" and "less preferable" may be thought to be equivalent to "more interested" and "less interested", respectively. Then, if interest vector for n interest categories is expressed by P=(p1, p2, . . . , pn), the interest vector P (p1, p2, . . . , pn) can be generated based on the preference vector V (v1, v2, . . . , vn) through conversion given by the following equation (20):

$$P = f[|v1|, \ldots |vi|, \ldots |vn|]$$ Eq. (20)

This conversion is performed in the user information registering phase by the user information registration request processor 111 in the control server 110.

FIG. 16 is a flowchart showing the routine in this phase which is executed by the control server 110. In step S201, it is determined whether or not the control server 110 has received user information from a peer device. If the control server 110 has received the user information, the routine proceeds to step S202. In step S202, it is determined whether or not the user information contains user interest information. If it contains user interest information, the routine proceeds to step S206, in which the interest vector parameters based the user interest information, as described with reference to FIG. 4, are stored and registered in the user information database 113 based on the received user interest information.

If it is determined in step S202 that the user information does not contain user interest information, the routine proceeds to step S203, in which it is determined whether or not the received user information contains user preference information. If it contains user preference information, the routine proceeds to step S204, in which the received user preference information is converted into interest vector by Equation (20), and the interest vector parameters described with reference to FIG. 4 are stored and registered in the user information database 113 based on the converted interest vector.

If the received user information does not contain either user interest information or user preference information, then, in step S205, interest information which is all set to zero is registered in the user information database 113. Also in this case, if the corresponding user searches for some content and successfully retrieves the content, the interest vector parameters in the database 113 are updated according to the above-described interest vector updating process. For example, a service provider for providing content can use the system of the present invention to provide specific content as recommendation for a group of users having similar interest.

Users having similar interest information can be specified using the information registered in a user information database of a control server in the system of the present invention. Since users having similar interest are distributed in a certain area in an interest space, such users are grouped using a statistic analysis such as a cluster analysis, and content relevant to that area is provided for the users as recommendation, thus achieving an effective recommendation system.

The control server can use the history of interest vectors of users to predict the next interest vector of a requesting user after this search. It can be thought that the requesting user is interested in the content contained in a device of a user having interest vector near the predicted interest vector. Thus, the content contained in a device of a user having interest vector near the predicted interest vector can be provided as recommendation, thereby achieving an effective recommendation system.

A peer information processing device, and a control server, as described above in the foregoing embodiment, are now described with reference to FIG. 17. The peer device of each user is implemented as, for example, a personal computer (PC) or the like having the communication capability, and the control server is also a data processing device, such as a PC, having a CPU (central processing unit) and having the communication capability, which includes a storage unit such as a hard disk and a DVD as a database.

Figure 17:
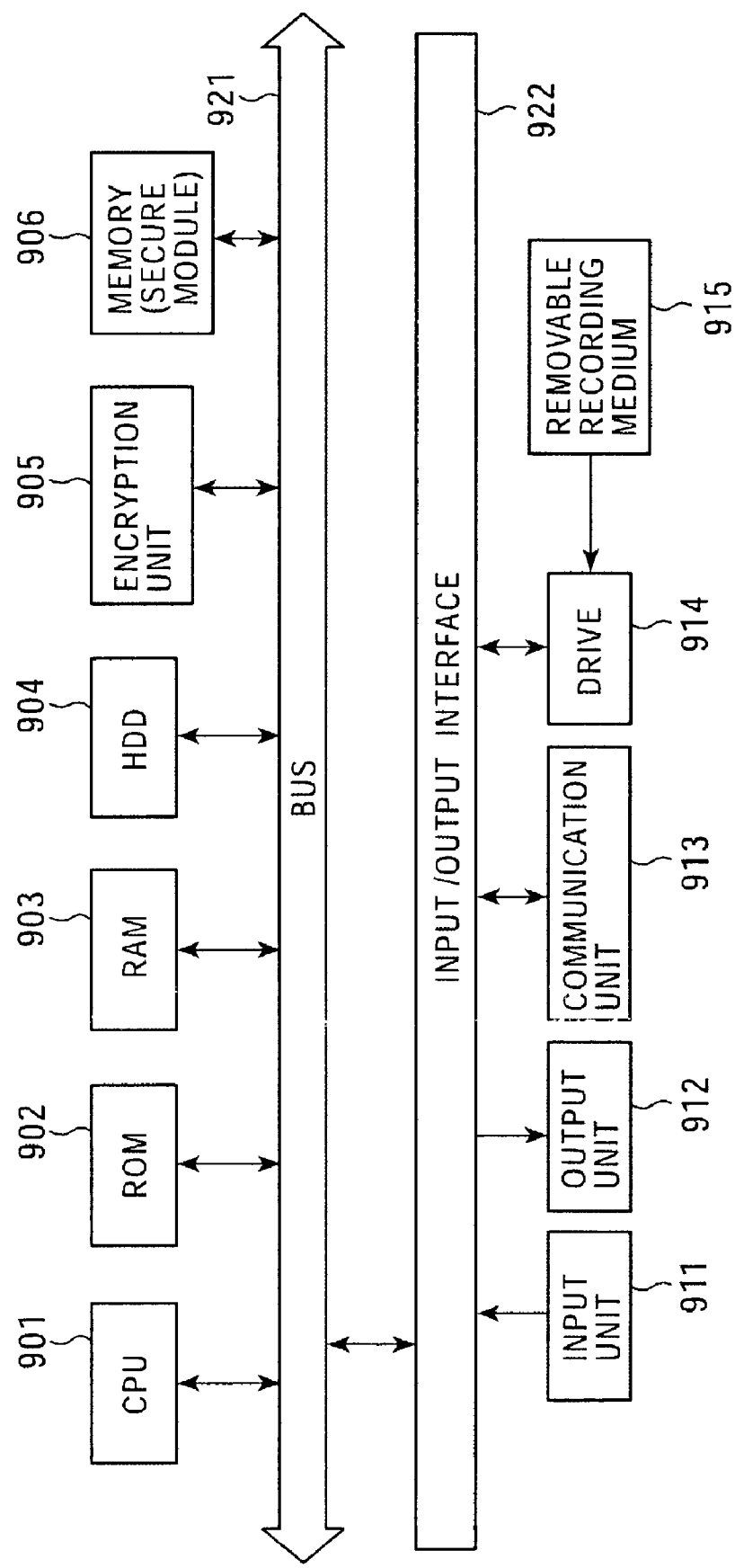
FIG. 17 is a block diagram of the configuration of a control server and a peer device in the data processing system according to the present invention.

FIG. 17 shows the configuration of the peer device and the control server each of which is implemented as a data processing device having a CPU 901 serving as a controller. The data processing device shown in FIG. 17 is merely illustrative, and the internal components do not necessarily have the functionality shown in FIG. 17. The CPU 901 is a processor for executing various execution programs and an operating system (OS). A ROM (read-only memory) 902 stores the programs executed by the CPU 901 or fixed data as computation parameters. A RAM (random access memory) 903 is used as a storage area and a work area for the programs executed by the CPU 901 and time-varying parameters during execution of the programs.

An HDD (hard disk drive) 904 controls a hard disk to store and read various data and programs in and from the hard disk. An encryption unit 905 performs encryption processing such as encoding, decoding, and authentication on transmission data. Since user personal information is exchanged over a network during communication of user information between a control server and a peer device, encryption is performed, if necessary. Although the encryption unit 905 is a discrete module in FIG. 17, in place of such an independent encryption module, for example, an encryption program may be stored in the ROM 902 and the encryption program stored in the ROM 902 may be read and executed by CPU 901. A memory (secure module) 906 may be a tamper-resistant memory for storing key data necessary for encryption, and access authority. Such data may be stored in another memory area or a storage medium.

A bus 921 may be implemented as a PCI (peripheral component internet/interface) bus, and may be used for data transfer between the modules and between input and output devices via an input/output interface 922. An input unit 911 is an input unit including a keyboard and a pointing device. When the input unit 911 is operated using a keyboard and/or a mouse, or when data is received via a communication unit 913, an instruction is input to the CPU 901 to execute a program stored in the ROM 902. An output unit 912 may be a CRT (cathode-ray tube) or a liquid crystal display for displaying various information in the form of text, image, or the like.

The communication unit 913 performs communication between the control server and a peer device, communication between peer devices, or communication between a peer device and another entity such as a service provider or an authority. The communication unit 913 transmits data supplied from storage units, data processed by the CPU 901, encrypted data, or the like, and receives data from another entity, under control of the CPU 901.

A drive 914 is a drive for playing back and recording a removable recording medium 915 such as a floppy disk, a CD-ROM (compact disc read-only memory), an MO (magneto-optical) disk, a DVD (digital versatile disc), a magnetic disk, or a semiconductor memory. The drive 914 allows a program or data to be played back from the removable recording medium 915, and allows a program or data to be recorded in the removable recording medium 915. When the program or data recorded in the recording medium 915 is read and executed or processed by the CPU 901, the read program or data is passed through the input/output interface 922 and the bus 921 to, for example, the connected RAM 903.

The individual processing methods for system components or the data processing method for the overall system described herein may be implemented in hardware or software or a combination thereof. If a processing sequence is implemented in software, a program forming the software may be incorporated in dedicated hardware of a computer, or a computer readable recording medium, such as a floppy disk or a CD-ROM, having the program stored therein may be provided for a general-purpose personal computer capable of performing various functions by installing various programs. The program may also be downloaded over a communication network such as the Internet. For example, the program may be pre-recorded in a recording medium such as a hard disk or a ROM. Alternatively, the program may be temporarily or persistently stored or recorded in a removable recording medium such as a floppy disk, a CD-ROM, an MO disk, a DVD, a magnetic disk, or a semiconductor memory. Such a removable recording medium may be used for so-called packaged software.

Instead of installation on a computer from such a removable recording medium, the program may be transferred by wireless communications from a download site to a computer, or transferred by wired communications to a computer over a network such as LAN (local area network) or the Internet. A computer can receive the program which is transferred in this way, and can install it on a recording medium such as an internal hard disk.

Various process steps described herein may be performed in a time-series manner according to the description, and may also be performed in parallel or independently depending upon the processing capability of a device for performing the processing or depending upon necessity. As used herein, the term "system" means a logical set of devices, which are not necessarily received in the same housing.

Although the present invention has been described with reference to specific embodiments, those of skill in the art will recognize that changes may be made thereto without departing from the spirit and scope of the present invention as set forth in the hereafter appended claims.

The invention claimed is:

1. A data processing system comprising:
   a plurality of peer information processing devices, each including a content database from which content is retrieved based on a content identifier; and
   a control server connected to the peer information processing devices over a network, the control server including:
   a user information database for storing:
   (a) interest information of users of the peer information processing devices and identification data for identifying users, the interest information including:
      (i) a first vector parameter representing a first degree or level of interest of a first user in categorized interest information;
      (ii) a second vector parameter representing a second degree or level of interest of a second user in categorized interest information;
      (iii) a first static initial interest vector associated with the first user;
      (iv) a second static initial interest vector associated with the second user;
   (b) a first interest vector corresponding to said first user representing said first degree or level of interest;
   (c) a second interest vector corresponding to said second user representing said second degree or level of interest, wherein the categorized interest information is grouped into predetermined categories independent of the user information database;
   content retrieval request processing for, upon receipt of a content retrieval request from one of the peer information processing devices:
   (a) retrieving the interest information which is stored in the user information database in correspondence with the requesting peer information processing device;
   (b) determining an order for sequentially issuing a plurality of content search requests based on said first interest vector and said second interest vector; and
   (c) extracting, in accordance with said determined order, from the user information database a user having a most similar interest information as indicated by measuring a distance between said first interest vector and said second interest vector;
   device search requesting means for inquiring about the presence or absence of the content in the peer information processing device of the user extracted by the content retrieval request processing means; and
   user interest managing means for updating the interest vector of a requesting user of the requesting peer information processing device when a content retrieval is performed in response to a content retrieval request from one of the peer information processing devices, wherein:
   (a) the distance between the interest vector of the requesting user and the interest vector of a user of one of the peer information processing devices which provides the content is reduced;
   (b) the level of interest in a category of the requesting user is updated based on the level of interest in the category of the user which provides the content; and
   (c) the interest vector of the requesting user is updated according to a degree of change associated with the user interest information over a predetermined elapsed time.

2. The data processing system of claim 1, wherein the content retrieval request processing further determines the distance between a third interest vector of a third user registered in correspondence with the requesting peer information processing device and a fourth interest vector of a fourth user registered in the user information database to extract, as a user having similar interest information to the interest information of the third user registered in correspondence with the requesting peer information processing device, a user having a short interest vector distance from the interest vector of the third user registered in correspondence with the requesting peer information processing device.

3. The data processing system of claim 1, the content retrieval request processing further determines the distance between a third interest vector of a third user registered in correspondence with the requesting peer information processing device and a fourth interest vector of a fourth user registered in the user information database to sequentially extract users having shorter distances from the interest vector of the third user registered in correspondence with the requesting peer information processing device in ascending order; and
   the device search requesting means inquires about the presence or absence of the content in the peer information processing devices in the order of the users extracted by the content retrieval processing means.

4. A data processing system according to claim 1, wherein the content retrieval request processing further determines the distance between a third interest vector of a third user registered in correspondence with the requesting peer information processing device and a fourth interest vector of a fourth user registered in the user information database to determine the vector lengths of users having an equal interest vector distance from the interest vector of the third user registered in correspondence with the requesting peer information processing device to sequentially extract users having greater vector lengths in descending order; and
   the device search requesting means inquires about the presence or absence of the content in the peer information processing devices in the order of the users extracted by the content retrieval request processing means.

5. The data processing system of claim 1, wherein the user interest managing means updates the interest vector of the requesting user when the content retrieval in response to the content retrieval request from one of the peer information processing devices is not performed for a predetermined time whereby the distance between the interest vector of the requesting user and an initial interest vector of the requesting user which is initially registered in the user information database is reduced.

6. The data processing system of claim 1 wherein one of the peer information processing devices sends a content retrieval request containing a user identifier and a content identifier to the control server;
   the content retrieval request processing further retrieves the interest information from the user information database based on the user identifier contained in the content retrieval request received from the requesting peer information processing device, and extracts from the user information database a user having similar user interest information to the retrieved interest information; and
   the content retrieval request processing further sends, to the requesting peer information processing device, address information of one of the peer information processing devices which is found by the content retrieval request processing and provides the content.

7. The data processing system of claim 1, wherein
   the control server further includes user information registration request processing means for, upon receipt of user registration information from one of the peer devices, when the user registration information contains interest information, registering a third interest vector based on the interest information in the user information database so as to have a correspondence with the identification data of each of the users, and when the user registration information contains preference information, for converting a preference vector based on the preference information into a converted interest vector, and registering the converted interest vector in the user information database so as to have a correspondence with the identification data of each of the users.

8. A data processing system according to claim 1, where measuring a distance between at least two interest vectors corresponding to the retrieved interest information includes calculating a magnitude where two interest vectors are equidistant from the requesting peer information processing device vector to determine the user having similar interest information.

9. A data processing system according to claim 1, wherein the degree of interest can be expressed by a vector value in each predetermined category.

10. A data processing system according to claim 1, wherein the device search requesting means sends a reply to the content retrieval request processing means indicating whether the content was located.

11. In a data processing system comprising a plurality of peer information processing devices and a control server which are connected with each other over a network, a data processing method performed by the control server, the data processing method comprising:
  receiving a content retrieval request from one of the peer information processing devices;
  searching a user information database which stores:
    (a) interest information of users of the peer devices and identification data for identifying the users; and
    (b) a first interest vector for a first user corresponding to said interest information;
    (c) a second interest vector for a second user corresponding to said interest information;
    (d) a first static initial interest vector associated with the first user,
    (e) a second static initial interest vector associated with the second user, the interest information including:
      (i) a first vector parameter representing a first degree or level of interest of the first user in categorized interest information; and
      (ii) a second vector parameter representing a second degree or level of interest of the second user in categorized interest information;
  retrieving the interest information of a user registered in correspondence to the requesting peer information processing device, wherein the categorized interest information is grouped into predetermined categories independent of the user information database;
  determining an order for sequentially issuing a plurality of content search requests based on said first interest vector and said second interest vector;
  extracting, in accordance with said determined order, from the user information database a user having a most similar interest information, as indicated by measuring a distance between said first interest vector and said second interest vector;
  inquiring about the presence or absence of the content in the peer information processing device of the user extracted in the user extracting step
  updating the interest vector of a requesting user of the requesting peer information processing device when a content retrieval is performed in response to a content retrieval request from one of the peer information processing devices wherein:

(a) the distance between the interest vector of the requesting user and the interest vector of a user of once of the peer information processing devices which provides the content is reduced;

(b) wherein the level of interest in a category of the requesting user is updated based on the level of interest in the category of the user which provides the content; and (c) the interest vector of the requesting user is updated according to a degree of change associated with the user interest information over a predetermined elapsed time.

12. The data processing method of claim 11, which includes determining the distance between a third interest vector of a third user registered in correspondence with the requesting peer information processing device and a fourth interest vector of a fourth user registered in the user information database to extract, as a user having similar interest information to the interest information of the third user registered in correspondence with the requesting peer information processing device, a user having a short interest vector distance from the interest vector of the third user registered in correspondence with the requesting peer information processing device.

13. The data processing method of claim 11, which includes:
  determining the distance between a third interest vector of a third user registered in correspondence with the requesting peer information processing device and a fourth interest vector of a fourth user registered in the user information database to sequentially extract users having a shorter distances from the interest vector of the third user registered in correspondence with the requesting peer information processing device in ascending order; and
  inquiring about the presence or absence of the content in the peer information processing devices in the order of the users extracted in the user extracting step.

14. The data processing method of claim 11, which includes:
  determining the distance between a third interest vector of a third user registered in correspondence with the requesting peer information processing device and a fourth interest vector of a fourth user registered in the user information database to determine the vector lengths of users having an equal interest vector distance from the interest vector of the third user registered in correspondence with the requesting peer information processing device to sequentially extract users having greater vector lengths in descending order; and
  inquiring about the presence or absence of the content in the peer information processing devices in the order of the users extracted.

15. A data processing method according to claim 11, wherein when the content retrieval in response to the content retrieval request from one of the peer information processing devices is not performed for a predetermined time, the interest vector of the requesting user is updated, whereby the distance between the interest vector of the requesting user and an initial interest vector of the requesting user which is initially registered in the user information database is reduced.

16. A data processing method according to claim 11, which includes sending the requesting peer information processing device address information of one of the peer information processing devices which is found in the inquiring step and which provides the content.

17. The data processing method of claim 11, which includes:

upon receipt of user registration information from one of the peer information processing devices, when the user registration information contains interest information, registering a third interest vector based on the interest information in the user information database so as to have a correspondence with the identification data of each of the users; and when the user registration information contains preference information, for converting a preference vector based on the preference information into a converted interest vector, and registering the converted interest vector in the user information database so as to have a correspondence with the identification data of each of the users.

18. A data processing method according to claim 11, where measuring a distance between at least two interest vectors corresponding to the retrieved interest information includes calculating a magnitude where two interest vectors are equidistant from the requesting peer information processing device vector to determine the user having similar interest information.

19. A data processing method according to claim 11, wherein the degree of interest can be expressed by a vector value in each predetermined category.

20. A data processing method according to claim 11, wherein the inquiry step indicates whether the content was located.

21. An information processing device in a system comprising a plurality of peer information processing devices and a control server which are connected with each other over a network, wherein the information processing device serves as the control server, the information processing device comprising:

a user information database for storing:
 (a) interest information of users of the peer information processing devices and identification data for identifying the users, the interest information including:
  (i) a first vector parameter representing a first degree or level of interest of a first user in categorized interest information;
  (ii) a second vector parameter representing a second degree or level of interest of a second user in categorized interest information;
  (iii) a first static initial interest vector associated with the first user;
  (iv) a second static initial interest vector associated with the second user;
 (b) a first interest vector for said first user;
 (c) a second interest vector for said second user, wherein the categorized interest information is grouped into predetermined categories independent of the user information database;

content retrieval request processing for, upon receipt of a content retrieval request from one of the peer information processing devices;
 (a) retrieving the interest information of a user registered in correspondence to the requesting peer information processing device from the user information database;
 (b) determining an order for sequentially issuing a plurality of content search requests based on said first interest vector and said second interest vector; and
 (c) extracting, in accordance with said determined order, from the user information database a user having a most similar interest information, as indicated by measuring a distance between said first interest vector and said second interest vector;

device search requesting means for inquiring about the presence or absence of the content in the peer information processing device of the user extracted by the content retrieval request processing means; and user interest managing means for updating the interest vector of a requesting user of the requesting peer information processing device when a content retrieval is performed in response to a content retrieval request from one of the peer information processing devices, wherein:
 (a) the distance between the interest vector of the requesting user and the interest vector of a user of one of the peer information processing devices which provides the content is reduced;
 (b) the level of interest in a category of the requesting user is updated based on the level of interest in category of the user which provides the content; and
 (c) the interest vector of the requesting user is updated according to a degree of change associated with the user interest information over a predetermined elapsed time.

22. The information processing device of claim 21, wherein the content retrieval request processing further determines the distance between a third interest vector of a third user registered in correspondence with the requesting peer information processing device and a fourth interest vector of a fourth user registered in the user information database to extract, as a user having similar interest information to the interest information of the third user registered in correspondence with the requesting peer information processing device, a user having a short interest vector distance from the interest vector of the third user registered in correspondence with the requesting peer device.

23. The information processing device of claim 21, wherein the content retrieval request processing further determines the distance between a third interest vector of a third user registered in correspondence with the requesting peer information processing device and a fourth interest vector of a fourth user registered in the user information database to sequentially extract users having shorter distances from the interest vector of the third user registered in correspondence with the requesting peer information processing device in ascending order; and the device search requesting means inquires about the presence or absence of the content in the peer information processing devices in the order of the users extracted by the content retrieval request processing means.

24. The information processing device of claim 21, wherein;

the content retrieval request processing further determines the distance between a third interest vector of a third user registered in correspondence with the requesting peer information processing device and the a fourth interest vector of a fourth user registered in the user information database to determine the vector lengths of users having an equal interest vector distance from the interest vector of the third user registered in correspondence with the requesting peer information processing device to sequentially extract users having greater vector lengths in descending order; and the device search requesting means inquires about the presence or absence of the content in the peer information processing devices in the order of the users extracted by the content retrieval request processing means.

25. The information processing device according to claim 21, wherein
the user interest managing means updates the interest vector of the requesting user when the content retrieval in response to a content retrieval in response to the content retrieval request from one of the peer information processing devices is not performed for a predetermined time whereby the distance between the interest vector of the requesting user and an initial interest vector of the requesting user which is initially registered in the user information database is reduced.

26. The information processing device according to claim 21, wherein the content retrieval request processing further retrieves the interest information from the user information database based on the user identifier contained in the content retrieval request received from the requesting peer information processing device, and extracts from the user information database a user having similar user interest information to the retrieved interest information; and
the content retrieval request processing further sends the requesting peer information processing device address information of one of the peer information processing devices which is found by the content retrieval request processing and provides content.

27. The information processing device of claim 21, which includes user information registration request processing means for, upon receipt of user registration information from one of the peer information processing devices, when the user registration information contains interest information, registering a third interest vector based on the interest information in the user information database so as to have a correspondence with the identification data of each of the users, and when the user registration information contains preference information, for converting a preference vector based on the preference information into a converted interest vector, and registering the converted interest vector in the user information database so as to have a correspondence with the identification data of each of the users.

28. An information processing device according to claim 21, where measuring a distance between at least two interest vectors corresponding to the retrieved interest information includes calculating a magnitude where two interest vectors are equidistant from the requesting peer information processing device vector to determine the user having similar interest information.

29. An information processing device according to claim 21, wherein the degree of interest can be expressed by a vector value in each predetermined category.

30. An information processing device according to claim 21, wherein the device search requesting means sends a reply to the content retrieval request processing means indicating whether the content was located.

31. A computer program including a computer readable medium containing executable instructions that when executed by one or more processors performs a process in response to a content retrieval request from one of peer information processing devices connected to a network, the process comprising:
a retrieval step of searching a user information database which stores interest information of users of the peer information processing devices and identification data for identifying the users, the interest information including:
(a) a first vector parameter representing a first degree or level of interest of a first user in categorized interest information;
(b) a second vector parameter representing a second degree or level of interest of a second user in categorized interest information;
(c) a first interest vector for said first user;
(d) a second interest vector for said second user;
(e) a first static initial interest vector associated with the first user; and
(f) a second static initial interest vector associated with the second user, and retrieving the interest information of a user registered in correspondence to the requesting peer device, wherein the categorized interest information is grouped into predetermined categories independent of the user information database;
a determining step of determining an order for sequentially issuing a plurality of content search requests based on said first interest vector and said second interest vector;
a user extracting step of extracting, in accordance with said determined order, from the user information database a user having a most similar interest information, as indicated by measuring a distance between the first interest vector and the second interest vector;
an inquiring step of inquiring about the presence or absence of the content in the peer information processing device of the user extracted in the user extracting step; and
a user interest managing step for updating the interest vector of a requesting user of the requesting peer information processing device when a content retrieval is performed in response to a content retrieval request from one of the peer information processing devices, wherein:
(a) the distance between the interest vector of the requesting user and the interest vector of the requesting user and the interest vector of a user of one of the peer information processing devices which provides the content is reduced;
(b) the level of interest in a category of the requesting user is updated based on the level of interest in the category of the user which provides the content; and
(c) the interest vector of the requesting user is updated according to a degree of change associated with the user interest information over a predetermined elapsed time.

32. A computer program according to claim 31, where measuring a distance between at least two interest vectors corresponding to the retrieved interest information includes calculating a magnitude where two interest vectors are equidistant from the requesting peer information processing device vector to determine the user having similar interest information.

33. A computer program according to claim 31, wherein the degree of interest can be expressed by a vector value in each predetermined category.

34. A computer program according to claim 31, wherein the inquiry step indicates whether the content was located.

* * * * *